US012217698B2

(12) United States Patent
Choi et al.

(10) Patent No.: US 12,217,698 B2
(45) Date of Patent: Feb. 4, 2025

(54) ODD AND EVEN ROW SEQUENTIAL DRIVING IN AMOLED WITH PENTILE ARRANGEMENT

(71) Applicant: GOOGLE LLC, Mountain View, CA (US)

(72) Inventors: Sangmoo Choi, Mountain View, CA (US); Sun-il Chang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/033,604

(22) PCT Filed: May 11, 2021

(86) PCT No.: PCT/US2021/070530
§ 371 (c)(1),
(2) Date: Apr. 25, 2023

(87) PCT Pub. No.: WO2022/240448
PCT Pub. Date: Nov. 17, 2022

(65) Prior Publication Data
US 2024/0021164 A1 Jan. 18, 2024

(51) Int. Cl.
*G09G 3/20* (2006.01)
*G09G 3/3266* (2016.01)

(52) U.S. Cl.
CPC ......... *G09G 3/3266* (2013.01); *G09G 3/2003* (2013.01); *G09G 2310/08* (2013.01); *G09G 2330/021* (2013.01)

(58) Field of Classification Search
None
See application file for complete search history.

(56) References Cited

U.S. PATENT DOCUMENTS

| | | | |
|---|---|---|---|
| 2015/0103068 A1 | 4/2015 | Kim et al. | |
| 2015/0194121 A1 | 7/2015 | Lee et al. | |

(Continued)

FOREIGN PATENT DOCUMENTS

| | | |
|---|---|---|
| CN | 112470209 | 3/2021 |
| JP | H08-068984 | 3/1996 |

(Continued)

OTHER PUBLICATIONS

International Search Report and Written Opinion in International Appln. No. PCT/US2021/070530, mailed on Apr. 7, 2022, 30 pages.

(Continued)

*Primary Examiner* — Carl Adams
(74) *Attorney, Agent, or Firm* — Fish & Richardson P.C.

(57) ABSTRACT

A display device includes subpixels of a first, second, and third colors, scan lines, and column lines. The subpixels are arranged in an array of rows and columns, with each subpixel in a column being electrically connected to a same column line. Each subpixels in a column is configured for receiving electronic scan signals that control a light output from an emissive element of the subpixel from a scan line and from the column line connected to the subpixel. One or more line drivers provide the electronic scan signals, during a time period for rendering a frame, to subpixels in a first set of columns first to subpixels of the first color and then to the subpixels of the third color and to subpixels in a second set of columns first to subpixels of the third color and then to the subpixels of the first color.

20 Claims, 14 Drawing Sheets

(56) References Cited

U.S. PATENT DOCUMENTS

| | | | | |
|---|---|---|---|---|
| 2018/0061366 | A1 | 3/2018 | Aflatooni et al. | |
| 2020/0211493 | A1 | 7/2020 | Kim et al. | |
| 2020/0243033 | A1 * | 7/2020 | Slavenburg .......... | G09G 3/3674 |
| 2021/0366343 | A1 * | 11/2021 | Oh ........................ | G09G 3/3291 |

FOREIGN PATENT DOCUMENTS

| | | |
|---|---|---|
| JP | 2005-250382 | 9/2005 |
| JP | 2017-072858 | 4/2017 |
| KR | 10-2003-0024404 | 3/2003 |
| KR | 10-2006-0011259 | 2/2006 |
| KR | 10-2015-0066981 | 6/2015 |
| KR | 10-2019-0045574 | 5/2019 |
| KR | 10-2019-0136396 | 12/2019 |
| KR | 10-2020-0107021 | 9/2020 |
| WO | WO 2010067641 | 6/2010 |
| WO | WO 2020239028 | 12/2020 |

OTHER PUBLICATIONS

Office Action in Taiwan Appln. No. 111109322, dated May 19, 2023, 37 pages (with English translation).

International Preliminary Report on Patentability in International Appln. No. PCT/US2021/070530, mailed on Nov. 23, 2023, 24 pages.

Office Action in Korean Appln. No. 10-2023-7034563, mailed on Oct. 30, 2024, 16 pages (with English translation).

Office Action in Japanese Appln. No. 2023-568348, mailed on Dec. 3, 2024, 10 pages (with English translation).

* cited by examiner

ODD AND EVEN ROW SEQUENTIAL DRIVING IN AMOLED WITH PENTILE ARRANGEMENT

CROSS-REFERENCE TO RELATED APPLICATION

This application is a 35 U.S.C. § 371 National Stage Application from PCT Application PCT/US2021/070530, filed May 11, 2021, the entire content of which is incorporated herein by reference.

FIELD OF THE DISCLOSURE

The present disclosure relates to a flat panel displays and, in particular, driving sequences for AMOLED displays with a pentile arrangement of pixels.

BACKGROUND

Flat panel displays have become larger and have been offered in new shapes. For example, aspect ratios of displays for mobile devices have increased from 16:9 to 21:9. In addition, refresh frequencies (i.e., frame rates) for these displays have increased. For example, frame rates of displays for mobile devices have increased from 60 Hertz (Hz) to 120 Hz. Both of these display trends correspond to an increase in power consumption by electrical circuitry driving the displays.

When the length of a display is increased, each column of the display includes additional pixels. All pixels in each column are controlled by signals carried by a column data line. When the length of the display is increased, these signals must have a higher switching frequency in order to control the additional pixels. In other words, to maintain (or increase) a frame rate, while increasing a length of the display, requires a high column line switching frequency (e.g., >100 kilohertz). In addition to the additional pixel circuits in a column signal line increasing the capacitance of the data lines, the increase of the switching frequency further linearly increases the dynamic power consumption in the driving circuitry. This power consumption trend for some example displays is shown in TABLE 1.

TABLE 1

Display Dynamic Power Consumption

| Aspect Ratio | 18.5:9 | 19:9 | 21:9 |
|---|---|---|---|
| Frame Rate (Hz) | 60 | 90 | 120 |
| Column Line Switching Frequency | 89 | 137 | 202 |
| Normalized Power Consumption | 1 | 1.5 | 2.3 |

SUMMARY

In a general aspect, a display device includes a plurality of subpixels of a first color, a plurality of subpixels of a second color, and a plurality of subpixels of a third color, a plurality of scan lines, and a plurality of column lines. The plurality of subpixels of the first, second, and third colors are arranged in an array, with the array having a plurality of rows and a plurality of columns, with rows of the array including subpixels arranged in a repeating pattern of subpixels of the first color, the second color, the third color, and the second color, and with alternating columns of the array including subpixels: (a) arranged in a repeating pattern of a subpixel of the first color and a subpixels of the third color, and (b) having only subpixels of the second color. Each subpixel in a column of the array is electrically connected to a same column line of the plurality of column lines, and each of the subpixels in a column is configured for receiving electronic scan signals from a scan line and from the column line connected to the subpixel, where the received signals control a light output from an emissive element of the subpixel. The display device includes one or more line drivers configured for providing the electronic scan signals, during a time period for rendering a frame on the display device, to subpixels in a first set of columns of subpixels first to subpixels of the first color and then to the subpixels of the third color and to subpixels in a second set of columns of subpixels first to subpixels of the third color and then to the subpixels of the first color.

Implementations can include one or more of the following features, alone or in any combination with each other.

For example, the one or more line drivers can include a first line driver configured to provide scan signals to subpixels of the first color in the first set of columns and to subpixels of the third color in the second set of columns, and a second line driver configured to provide scan signals to subpixels of the third color in the first set of columns and to subpixels of the first color in the second set of columns.

The display device can include a timing controller electrically coupled to the first and second line drivers, where the timing controller is configured for providing, during the time period for rendering a frame on the display device, a first start pulse signal to the first line driver, a second start pulse to the second line driver and a plurality of clock signals to both the first and second line drivers, and where the first line driver is configured for providing the scan signals to subpixels of the first color in the first set of columns and to subpixels of the third color in the second set of columns in response to the provided first start pulse signal and the plurality of clock signals, and where the second line driver is configured for providing scan signals to subpixels of the third color in the first set of columns and to subpixels of the first color in the second set of columns in response to the provided second start pulse signal and the plurality of clock signals.

The display device can include a timing controller electrically coupled to the first and second line drivers, where the timing controller is configured for providing, during a time period for rendering a frame on the display device, a common start pulse signal to the first line driver and to the second line driver, a plurality of first clock signals to the first line driver and a plurality of second clock signals to the second line driver, and where the first line driver is configured for providing the scan signals to subpixels of the first color in the first set of columns and to subpixels of the third color in the second set of columns in response to the provided common start pulse signal and the plurality of first clock signals, and where the second line driver is configured for providing scan signals to subpixels of the third color in the first set of columns and to subpixels of the first color in the second set of columns in response to the provided common start pulse signal and the plurality of second clock signals.

The display device can include a timing controller electrically coupled to the first and second line drivers, where the timing controller is configured for providing, during a time period for rendering a frame on the display device, a first start pulse signal to the first line driver, a plurality of first clock signals to the first line driver and a plurality of second clock signals to the second line driver, and where the first line driver is configured for providing the scan signals to subpixels of the first color in the first set of columns and to subpixels of the third color in the second set of columns in response to the provided first start pulse signal and the plurality of first clock signals and where the first line driver is configured for providing a second start pulse signal to the second line driver when first line driver has provided scan signals to all of the subpixels of the first color in the first set of columns and all of the subpixels of the third color in the second set of columns, and where the second line driver is configured for providing scan signals to subpixels of the third color in the first set of columns and to subpixels of the first color in the second set of columns in response to the provided second start pulse signal and the plurality of second clock signals.

The first line driver can be configured for providing scan signals to subpixels of the first color in the first set of columns and to subpixels of the third color in the second set of columns a sequential order, on each column, from a top of the display device to a bottom of the display device, and the second line driver can be configured for providing scan signals subpixels of the third color in the first set of columns and to subpixels of the first color in the second set of columns a sequential order, on each column, from a bottom of the display device to a top of the display device.

The display device can include a timing controller electrically coupled to the first and second line drivers, where the timing controller is configured for providing, during a time period for rendering a frame on the display device, a first start pulse signal to the first line driver, a plurality of first clock signals to the first line driver and a plurality of second clock signals to the second line driver, and where the first line driver is configured for providing the scan signals to subpixels of the first color in the first set of columns and to subpixels of the third color in the second set of columns in response to the provided first start pulse signal and the plurality of first clock signals and wherein the first line driver is configured for providing a second start pulse signal to the second line driver when first line driver has provided scan signals to all of the subpixels of the first color in the first set of columns and to all of the subpixels of the third color in the second set of columns, and where the second line driver is configured for providing scan signals to subpixels of the third color in the first set of columns and to subpixels of the first color in the second set of columns in response to the provided second start pulse signal and the plurality of second clock signals.

The display device can include a timing controller electrically coupled to the first and second line drivers, where the timing controller is configured for providing, during a time period for rendering a frame on the display device, a first start pulse signal to the first line driver, a plurality of clock signals to both the first line driver to the second line driver, and where the first line driver is configured for providing the scan signals to subpixels of the first color in the first set of columns and to subpixels of the third color in the second set of columns in response to the provided first start pulse signal and the plurality of clock signals and where the first line driver is configured for providing a second start pulse signal to the second line driver when first line driver has provided scan signals to all of the subpixels of the first color in the first set of columns and to all off the subpixels of the third color in the second set of columns, and where the second line driver is configured for providing the scan signals to subpixels of the third color in the first set of columns and to subpixels of the first color in the second set of columns in response to the provided second start pulse signal and the plurality of clock signals.

The subpixels of the first, second, and third colors can include organic light emitting diodes and the first color can include red (R), the second color can include green (G), the third color can include blue (B), and the plurality of subpixels of the first, second, and third colors can be arranged in a Pentile RGBG array.

The plurality of rows of the display device can include more than 1300 rows, and the plurality of columns in the display device can include more than 700 columns.

In another general aspect, a method of driving a display panel is disclosed. The display panel includes: a plurality of subpixels of a first color; and a plurality of subpixels of a second color; a plurality of subpixels of a third color, with the plurality of subpixels of the first, second, and third colors being arranged in an array having a plurality of rows and a plurality of columns, with rows of the array including subpixels arranged in a repeating pattern subpixels of the first color, the second color, the third color, and the second color, and with alternating columns of the array including subpixels: (a) arranged in a repeating pattern of a subpixel of the first color and a subpixels of the third color, and (b) including only subpixels of the second color, a plurality of scan lines; and a plurality of column lines, with each subpixel in a column of the array being electrically connected to a same column line of the plurality of column lines. The method includes providing to each subpixel electronic signals from a scan line and from a column line, where the provided signals control a light output from an emissive element of the subpixel, and providing scan signals, from one or more line drivers, during a time period for rendering a frame on the display device, to subpixels in a first set of columns of subpixels first to subpixels of the first color and then to the subpixels of the third color and to subpixels in a second set of columns of subpixels first to subpixels of the third color and then to the subpixels of the first color.

Implementations can include one or more of the following features, alone or in any combination with each other.

For example, the method can further include providing scan signals to subpixels of the first color in the first set of columns and to subpixels of the third color in the second set of columns from a first line driver, and providing scan signals to subpixels of the third color in the first set of columns and to subpixels of the first color in the second set of columns from a second line driver.

The method can further include providing, from a timing controller electrically coupled to the first and second line drivers, during the time period for rendering a frame on the display device, a first start pulse signal to the first line driver, a second start pulse to the second line driver and a plurality of clock signals to both the first and second line drivers, and providing scan signals to subpixels of the first color in the first set of columns and to subpixels of the third color in the second set of columns in response to the provided first start pulse signal and the plurality of clock signals, and providing scan signals to subpixels of the third color in the first set of columns and to subpixels of the first color in the second set of columns in response to the provided second start pulse signal and the plurality of clock signals.

The method can further include providing, from a timing controller electrically coupled to the first and second line drivers, during the time period for rendering a frame on the display device, a common start pulse signal to the first line driver and to the second line driver, a plurality of first clock signals to the first line driver, and a plurality of second clock signals to the second line driver, and providing scan signals to subpixels of the first color in the first set of columns and to subpixels of the third color in the second set of columns in response to the provided common start pulse signal and the plurality of first clock signals, and providing scan signals to subpixels of the third color in the first set of columns and to subpixels of the first color in the second set of columns in response to the provided common start pulse signal and the plurality of second clock signals.

The method can further include providing, from a timing controller electrically coupled to the first and second line drivers, during the time period for rendering a frame on the display device, a first start pulse signal to the first line driver, a plurality of first clock signals to the first line driver, and a plurality of second clock signals to the second line driver, and providing, from the first line driver, scan signals to subpixels of the first color in the first set of columns and to subpixels of the third color in the second set of columns in response to the provided first start pulse signal and the plurality of first clock signals, and providing, from the first line driver, a second start pulse signal to the second line driver when first line driver has provided scan signals to all of the subpixels of the first color in the first set of columns and all of the subpixels of the third color in the second set of columns, and providing, from the second line driver, scan signals to subpixels of the third color in the first set of columns and to subpixels of the first color in the second set of columns in response to the provided second start pulse signal and the plurality of second clock signals.

The method can further include providing, from the first line driver, scan signals to subpixels of the first color in the first set of columns and to subpixels of the third color in the second set of columns a sequential order, on each column, from a top of the display device to a bottom of the display device, and providing, from the second line driver, scan signals subpixels of the third color in the first set of columns and to subpixels of the first color in the second set of columns a sequential order, on each column, from a bottom of the display device to a top of the display device.

The method can further include providing, from a timing controller electrically coupled to the first and second line drivers, during the time period for rendering a frame on the display device, a first start pulse signal to the first line driver, a plurality of first clock signals to the first line driver, and a plurality of second clock signals to the second line driver, and providing the scan signals to subpixels of the first color in the first set of columns and to subpixels of the third color in the second set of columns in response to the provided first start pulse signal and the plurality of first clock signals, and providing a second start pulse signal from the first line driver to the second line driver when first line driver has provided scan signals to all of the subpixels of the first color in the first set of columns and to all of the subpixels of the third color in the second set of columns, and providing scan signals from the second line driver to the subpixels of the third color in the first set of columns and to the subpixels of the first color in the second set of columns in response to the provided second start pulse signal and the plurality of second clock signals.

The method can further include providing, from a timing controller electrically coupled to the first and second line drivers, during the time period for rendering a frame on the display device, a first start pulse signal to the first line driver and a plurality of clock signals to both the first line driver to the second line driver, and providing scan signals to the subpixels of the first color in the first set of columns and to subpixels of the third color in the second set of columns in response to the provided first start pulse signal and the plurality of clock signals, and providing a second start pulse signal from the first line driver to the second line driver when first line driver has provided scan signals to all of the subpixels of the first color in the first set of columns and to all of the subpixels of the third color in the second set of columns, and providing the scan signals to the subpixels of the third color in the first set of columns and to subpixels of the first color in the second set of columns in response to the provided second start pulse signal and the plurality of clock signals.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily drawn to scale and may not be in scale relative to each other. Like reference numerals designate corresponding parts throughout the several views.

DETAILED DESCRIPTION

Figure 1:
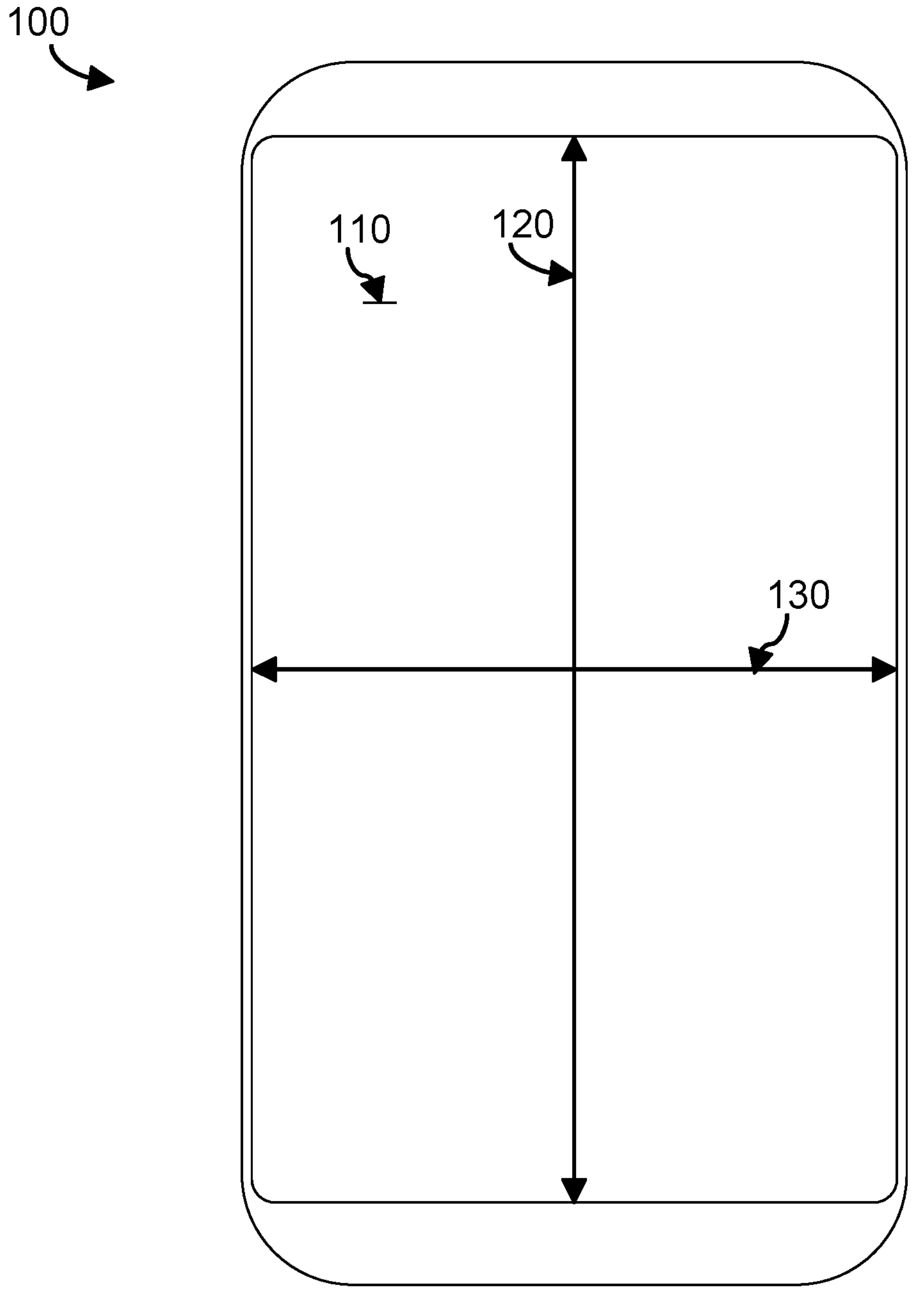
FIG. 1 depicts a front surface of a mobile device with a display.

FIG. 1 depicts an example mobile computing device 100. A front surface of the mobile device 100 is shown. The front surface includes a display 110 having an aspect ratio (AR) defined as a ratio of a height 120 to a width 130 (i.e., AR=height/width). A display 110 for the mobile device 100 may have a height (a.k.a. length) 120 that is more than twice the width 130. For example, a high AR display may have an AR that is greater than 18.5 to 9.

Figure 2:
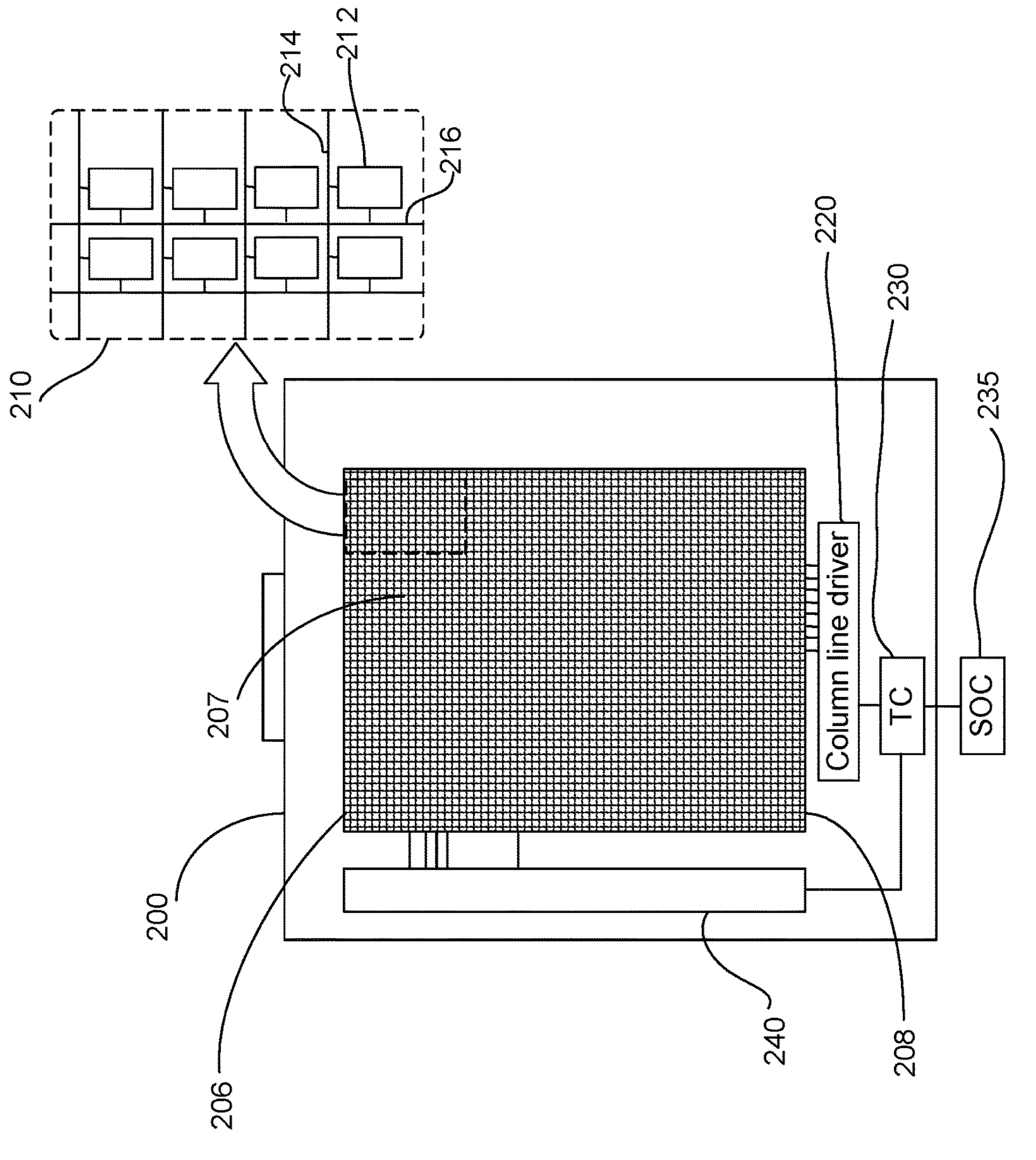
FIG. 2 schematically depicts a possible implementation of a display system for a mobile computing device.

FIG. 2 schematically depicts a possible display panel 200 that can be used with the mobile device 100 of FIG. 1. The display panel 200 includes a display pixel array (e.g., display active area 207) having emissive pixels and subpixels that are controlled by electronic pixel circuits and/or subpixel circuits to render a visual output (e.g., text, graphics, video, images, etc.) on the display. A subpixel can be considered as an individual light emitting element, generally having a monochromatic light output, whereas a pixel can be considered as a combination of two or more light emitting elements, where the different elements have different colors, so the subpixels of a pixel can be controlled to output a range of colors from the pixel. The display panel 200 can include multiple scan signal lines that provide signals to rows of pixel circuits in the display panel. The scan signal lines can include a plurality of lines for selecting the pixel circuits of each row of pixel circuits and for controlling the electric current transfer to the emissive device (e.g., OLEDs) in the pixel circuits. The display may be any active matrix display, such as an active matrix organic light emitting diode (AMOLED) display.

A magnified portion 210 of the active area 207 is shown. The magnified portion 210 illustrates the row/column configuration of subpixels, including a plurality of subpixels 212. In some implementations, the active area 207 can include more than 700 columns and more than 1300 rows. For example, the device can include at least 750 columns and at least 1334 rows. For example, the device can include at least 1080 columns and at least 1920 rows. The light emission of each subpixel 212 can be controlled by signals provided on a scan signal line 214 (i.e., a horizontal control line) and on a column data line 216 (i.e., a vertical control line) that are electrically connected to the subpixel, and the provided signals can determine an amount of driving current provided to the emissive element of the subpixel. Horizontal and vertical may refer to the orientation of a line when the computing device display panel 200 is in the orientation in which it is intended to be used. The horizontal signals lines 214 and/or rows of pixels can be numbered sequentially from a top portion 206 of an active area 207 of the display panel 200 to a bottom portion 208 of the active area 207 of the display panel 200. The top portion 206 of the active area 207 refers to the top portion of the active area 207 when the display panel 200 is in the orientation in which it is to be viewed by a user. In some implementations, and as illustrated in FIG. 2, all subpixels in a row can be driven by the same scan signal line, and all subpixels in a column can be driven by the same column data line.

The scan signal lines 214 of the display pixel array 110 are controlled by line drivers 240. The column data lines are controlled by column line drivers 220. A timing controller (TC) 230 can control signals to the line drivers 240 and to the column line drivers 220 to ensure proper timing of signals to individual subpixels to achieve a desired light emission from the subpixels.

During each image frame that is displayed on the display panel 200, the horizontal scan signal lines 214 can sequentially and/or successively provide signals to the rows of pixels. In one implementation, the first and/or topmost row of pixels can receive signals at or near a beginning of the frame, and the last and/or the lower-most and/or bottommost row of pixels can receive signals at or near an end of the frame. Signals provided to a subpixel by the scan line drivers 240 over a scan line 214 can be used to initialize and reset a subpixel for receiving new data signals when a new frame is provided to the display panel and to turn driving current to the pixel on or off.

Column data lines 216 can provide signals for controlling the subpixel of each column of subpixels (e.g., by writing a data voltage for driving the pixel to the subpixel circuit associated with the subpixel). For clarity, two column data lines are shown in magnified portion 210, but many more exist in the display panel 200. The column data lines 216 can provide signals to columns of pixels in the active area 207 of the display panel 200. The horizontal scan signal lines 214 and the column data lines 216 can combine to provide signals to individual subpixels on the display panel 200, causing the individual subpixels to emit a specific amount and color of light seen by a user.

The timing controller 230 of the display panel 200 can communicate with an external processor 235 (e.g., a GPU or a processor that is part of a system-on-a-chip (SoC)) that can provide signals to the timing controller 230 for driving pixels in the active area 207 of the panel. The timing controller 230 can receive control signals from the external processor 235 that includes, for example, a central processing unit (CPU).

Sending electrical signals to the subpixels to control the emission of light from the subpixels involves controlling the timing of the voltage levels on the scan and column lines. As mentioned previously, higher frame rates and/or longer displays (i.e., higher AR displays) can lead to high switching frequencies of the signals on the scan and column lines. In addition, the increased column line parasitic capacitance due to the high aspect ratio, can lead to an undesirably high dynamic power consumption in driving of the display panel driving. Accordingly, when a column line connects to many pixels and/or when the display is operated at a high frame rate, it may be desirable to reduce/minimize the number of voltage level changes that are required, in practice, to program a new image data to pixels displaying the new images on the screen.

Figure 3A:
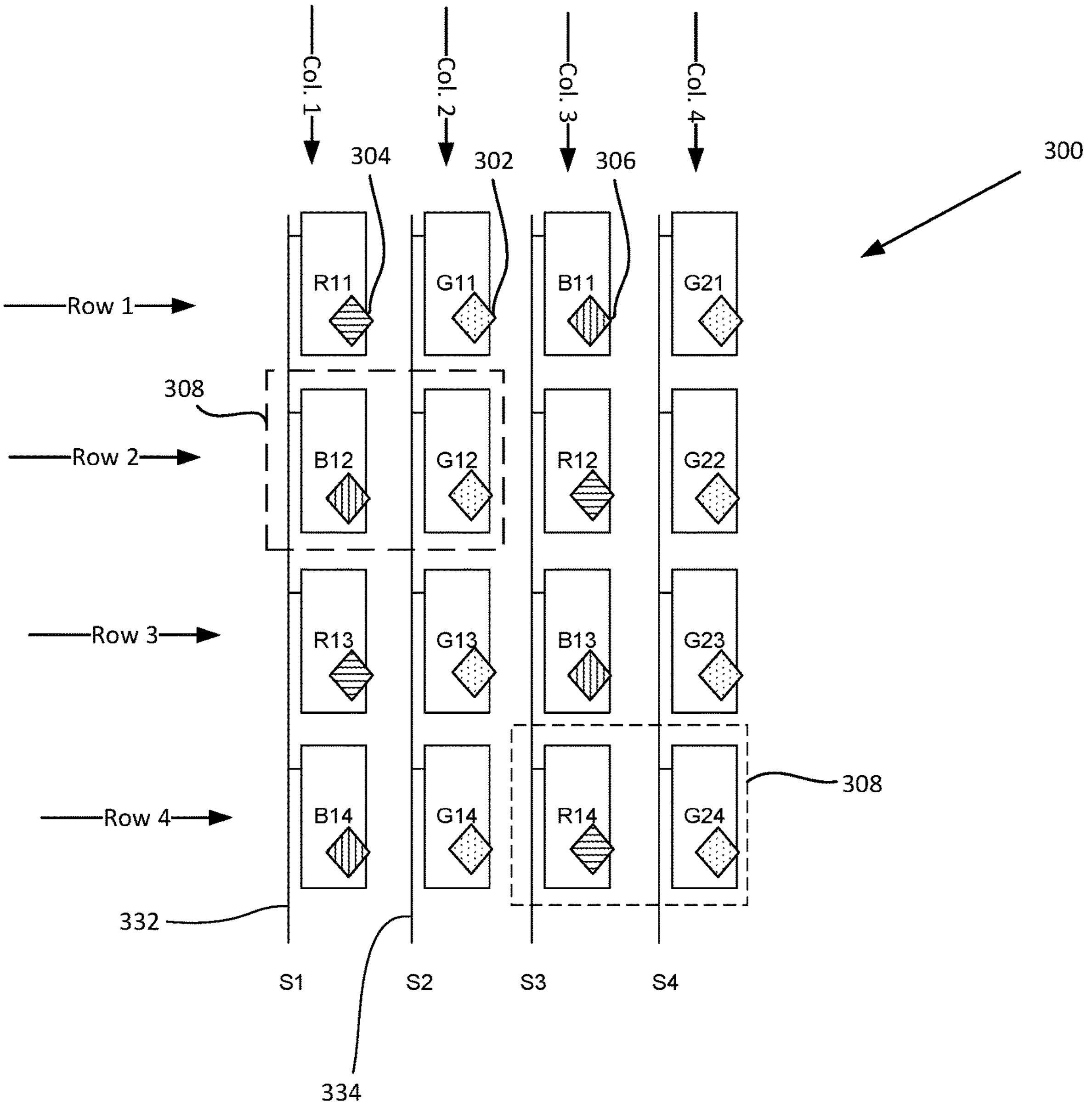
FIG. 3A is schematic diagram of a Pentile RGBG array of red, green, and blue subpixels in a display.

FIG. 3A is schematic diagram of a Pentile RGBG array 300 of subpixels of a first, second, and third color (e.g., red, green, and blue) in a display and circuits that drive subpixels. Each red, green, and blue subpixel can include an LED of the corresponding color. In each row of the Pentile RGBG array 300, green subpixels 302 are interleaved with alternating red subpixels 304 and blue subpixels 306. As shown in FIG. 3A, green subpixel LEDs are shown by dotted diamonds; red subpixel LEDs are shown by horizontally-striped diamonds; and blue subpixel LEDs are shown by vertically-striped diamonds. In FIG. 3A, circuits that drive an LED in the array are shown as rectangles and are labeled with a capital letter corresponding to the color of the LED that is driven by the circuit and a two-digit index value, where the second digit of the index value indicates the row number in a numbered order (e.g., from top to bottom) of the driven LED, and the first digit of the index value indicates the number in a numbered order (e.g., from left to right) of the LED of the designated color in the designated row. Thus, for example, the circuit labelled R11 drives the red LED in the top row and the left-most column; the circuit labelled G11 drives the green LED in the top row and in the second column; the circuit labelled R12 drives the red LED in the second row from the top and in the third column (which is the first red LED in the second column when proceeding from left to right); etc.

Columns of the Pentile RGBG array 300 alternate between having all green subpixels 302 and having alternating red subpixels 304 and blue subpixels 306. For example, the left most column shown in FIG. 3A, in which subpixels are driven by voltage signals S1 supplied on column line 332, includes subpixels that alternate between red and blue in alternating rows of the column, and the column neighboring the left-most column includes all green subpixels that are driven by voltage signals S2 supplied on column line 334.

In the Pentile RGBG array 300, a pixel 308 of the display can be considered to include a combination of a red subpixel 304 and a green subpixel 302 or a combination of a blue subpixel 306 and a green subpixel 302. Thus, pixels in the Pentile RGBG array 300 can provide a spectrum of colors. With tight packing of the pixels in modern high-resolution displays, a user generally cannot perceive individual pixels 308, and the overall effect of the array 300 perceived by the user is that any color can be emitted from any location on the display. Furthermore, with the Pentile RGBG array arrangement of subpixels, subpixels of certain colors (e.g., red and blue) can be decreased in number, compared to a conventional RGB stripe arrangement of subpixels (RGBRGB subpixels for two pixels), such that a display panel using Pentile RGBG array of subpixels uses one-third fewer subpixels than a conventional RGB stripe display with the same resolution. Thus, higher-resolution, brighter devices are possible with the Pentile RGBG array arrangement of subpixels.

Figure 3B:
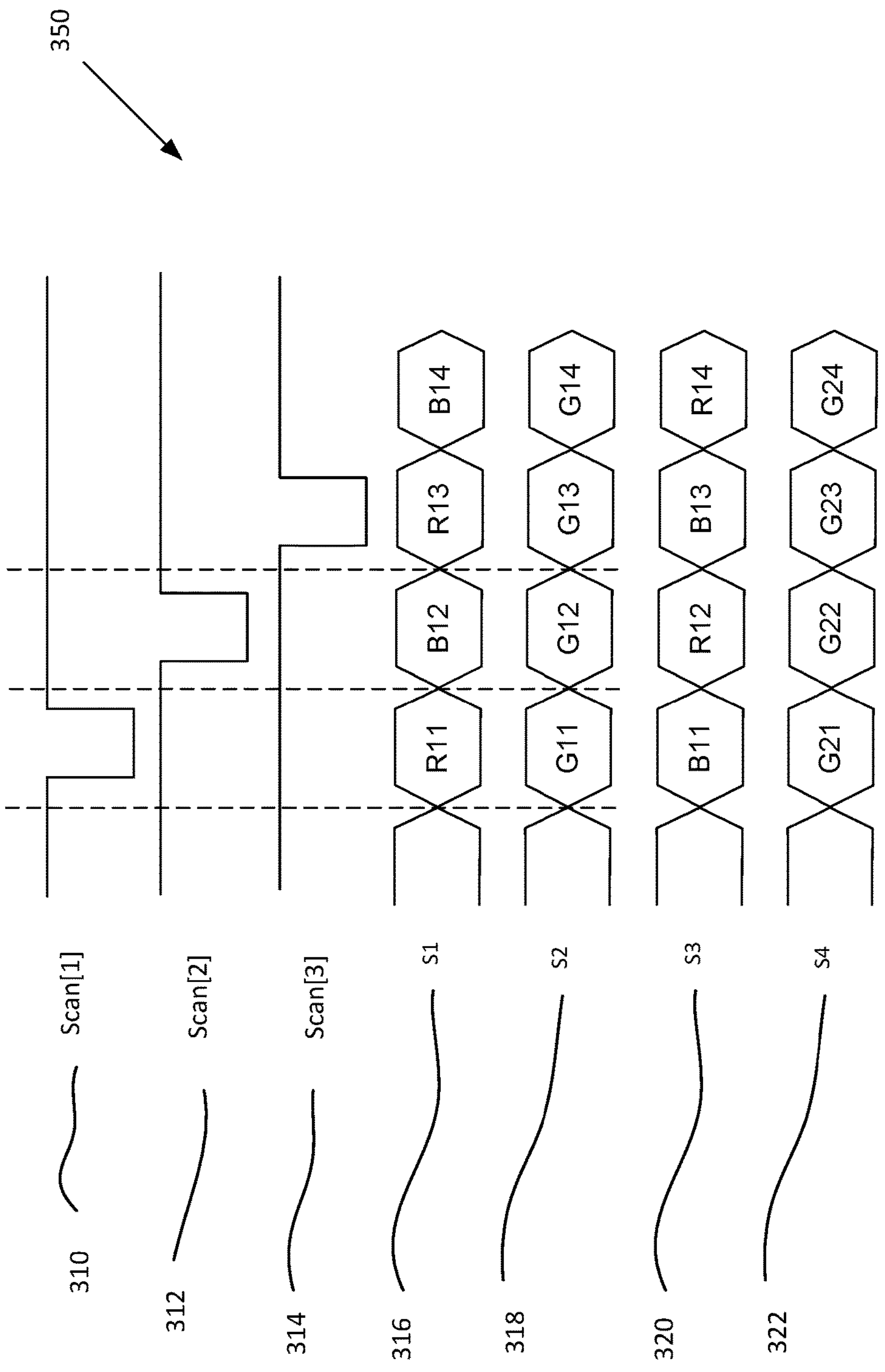
FIG. 3B is a timing diagram illustrating the addressing of individual subpixels in a Pentile RGBG array.

FIG. 3B is a timing diagram 350 illustrating the addressing of individual subpixels in the Pentile RGBG array 300. In the timing diagram 350, the state of scan[1] 310 represents the voltage applied to the scanline that controls subpixels in row 1; the state of scan[2] 312 represents the voltage applied to the scanline that controls subpixels in row 2; and the state of scan[3] 314 represents the voltage applied to the scanline that controls subpixels in row 3. The state of the scanline controlling the subpixels in row 4 is not shown in FIG. 3B but can be understood as an extension from lines 310, 312, and 314. The state of column line 316 represents the voltage applied to the column line that controls subpixels in column 1; the state of column line 318 represents the voltage applied to the column line that controls subpixels in column 2; the state of column line 320 represents the voltage applied to the column line that controls subpixels in column 3; and the state of column line 322 represents the voltage applied to the column line that controls subpixels in column 4.

The states of the scan lines 310, 312, 314 and the signals S1, S2, S3 and S4 supplied on the column lines indicate that a voltage is switched between high and low states on individual scan lines 310, 312, 314 corresponding to rows 1, 2, and 3, for fixed periods of time. When the voltage on a scan line for a row is "ON," which is the case when the scan line voltage level is low for p-channel transistor switches in the pixel circuit, this allows the subpixel circuits in the row to be updated with a new data voltage, by signals S1, S2, S3 and S4 supplied on the column lines for the subpixels in the ON row. When the signal on the scan line for the row is "OFF," which is the case when the scan line voltage level is high for p-channel transistor switches in the pixel circuit, the subpixels in the row are disconnected from the column data lines, and cannot be updated.

Because the display of an image on a display panel often requires neighboring pixels to have similar colors and brightness, conventional techniques of driving the subpixels of a panel generally lead to relatively high changes of voltage levels applied to a column data line to render the image. Consider, for example, the rendering of an image that is red over the entire area of the display, such that voltage control signals sent to red subpixels ($V_R$) are at their maxima (e.g., $V_R$=255, where $V_R$ can have an integer value from 0 to 255), while voltage control signals sent to blue and green subpixels ($V_B$ and $V_G$, respectively) are at their minima (e.g., $V_B$=0, and $V_G$=0 where $V_B$ and $V_G$ can have an integer values from 0 to 255).

Figure 4:
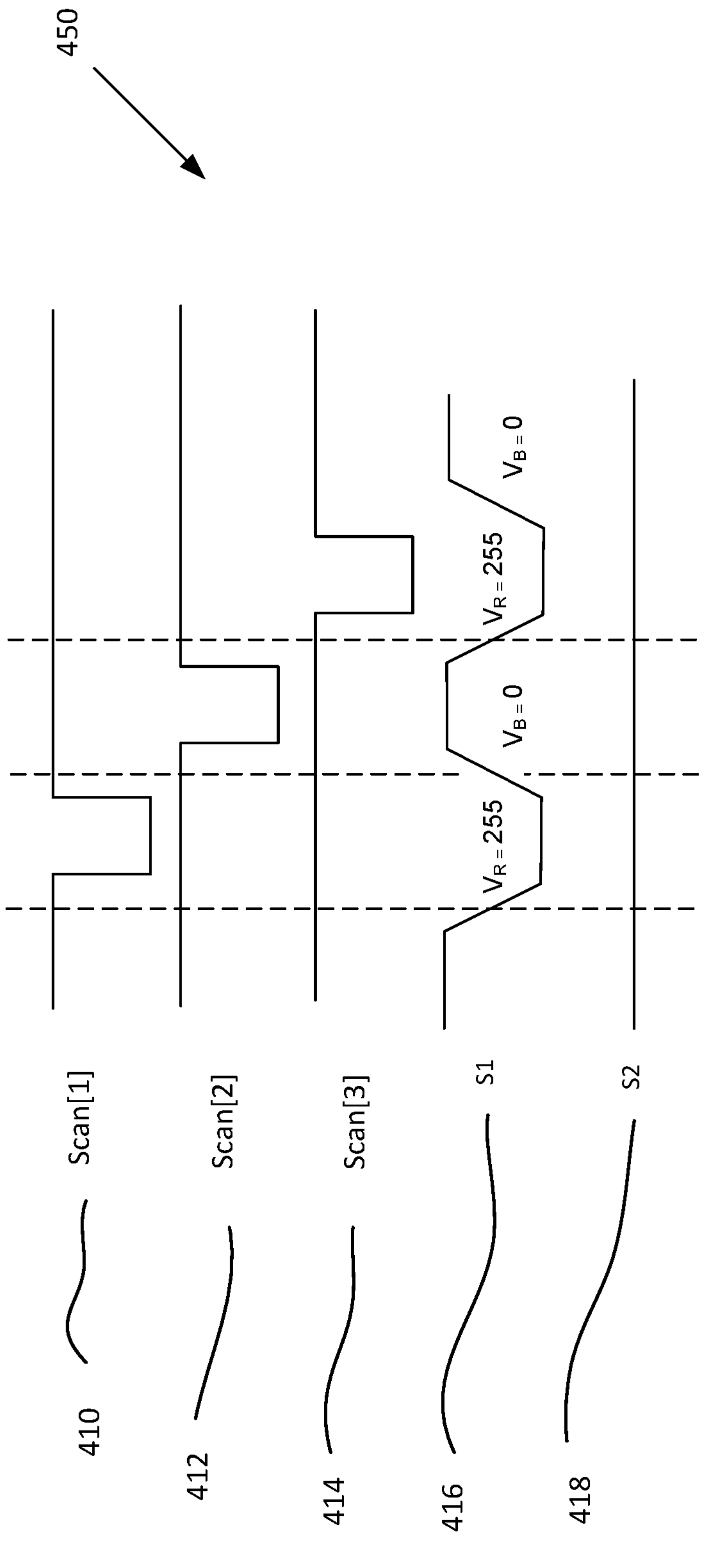
FIG. 4 is a timing diagram illustrating the addressing of individual subpixels in Pentile RGBG array when an image that is all red is displayed.

FIG. 4 is a timing diagram 450 illustrating the addressing of individual subpixels in the Pentile RGBG array when an image that is all red is displayed. In the timing diagram 450, the state of scan[1] 410 represents the voltage applied to the scanline that controls subpixels in row 1; the state of scan[2] 412 represents the voltage applied to the scanline that controls subpixels in row 2; and the state of scan[3] 414 represents the voltage applied to the scanline that controls subpixels in row 3. The state of column line 416 represents the voltage applied to the column line that controls subpixels in column 1; and the state of column line 418 represents the voltage applied to the column line that controls subpixels in column 2.

The states of the scan lines 410, 412, 414 and the signals S1 and S2 supplied on the column lines indicate that a voltage applied to column line 416 switches between a maximum value and a minimum value when pixels of alternating rows of the array are address, so that red subpixels are turned on and blue subpixels are turned off and that a voltage applied to column line 418 remains at a constant minimum value, so that green subpixels are turned off. The rapid switching of the voltage on column line 416, which alternately address red and blue subpixels, can lead to high parasitic capacitance losses as the subpixels are addressed.

Figure 5A:
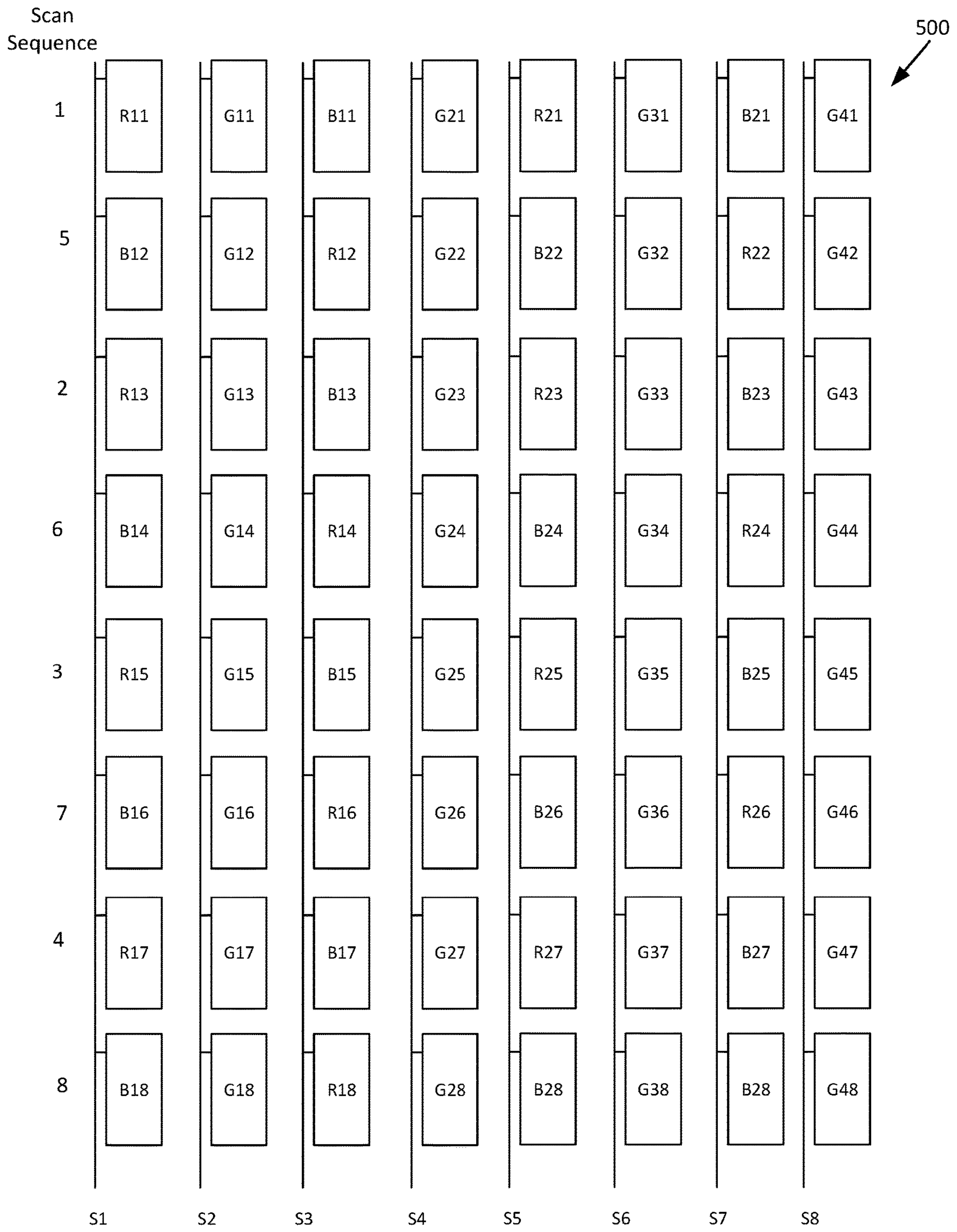
FIG. 5A is a schematic diagram of a Pentile RGBG array of subpixels of a first, second, and third color (e.g., red, green, and blue) in a display panel and a scan sequence for driving the rows of subpixels.

FIG. 5A is a schematic diagram of an array (e.g., a Pentile RGBG array) 500 of subpixels of a first, second, and third color (e.g., red, green, and blue) in a display panel and a scan sequence for driving the rows of subpixels, where the scan sequence can reduce power losses due to parasitic capacitance when operating the display panel that includes the array. Like the array 300 of FIG. 3A, the array 500 includes a plurality of pixels a repeating pattern of subpixels of the first, second, and third colors. The array 500 includes a plurality of rows of subpixels, and each row of array 500 includes green subpixels interleaved with alternating red subpixels and blue subpixels. In FIG. 5A, circuits that drive an LED in the array are shown as rectangles and are labeled with a capital letter corresponding to the color of the LED that is driven by the circuit and a two-digit index value, where the second digit of the index value indicates the row number (from top to bottom) of the driven LED, and the first digit of the index value indicates the number (from left to right) of the LED of the designated color in the designated row. Thus, for example, the circuit labelled R11 drives the red LED in the top row and the left-most column; the circuit labelled G11 drives the green LED in the top row and in the second column; the circuit labelled R12 drives the red LED in the second row from the top and in the third column (which is the first red LED in the second column when proceeding from left to right); etc.

The rows of subpixels shown in FIG. 5A include subpixels arranged in a repeating pattern of a subpixels of the first color (e.g., red), a subpixel of the second color (e.g., green), a subpixel of the third color (e.g., blue), and a subpixel of the first color. For example, the top row includes, from left to right, subpixels R11, G11, B11, G21, etc. Alternating columns of the array 500 can include subpixels arranged in a repeating pattern of (a) columns having a subpixel of the first color and a subpixel of the third color and (b) columns having only subpixels of the second color. For example, the left-most column includes, from top to bottom, subpixels R11, B12, R13, B14, etc., and the second column from the left includes subpixels of only green subpixels.

Rather than addressing each row of pixels sequentially from top to bottom, which leads to relatively high parasitic capacitance losses, as described, for example, with respect to FIGS. 3B and 4, odd rows of pixels in FIG. 5A first can be addressed sequentially from top to bottom, and then even rows of pixels can be addressed sequentially from top to bottom. Thus, for the array of eight rows of pixels shown in FIG. 5, the sequence in which the rows of pixels are scanned can be: 1, 3, 5, 7, 2, 4, 6, 8, where the first row is at the top of the array and the eighth row is at the bottom of the array. In this manner, scan signals can be provided, during a time period for rendering a frame on the display panel, to subpixels in a first set of columns (e.g., a set that includes the left-most column and the fifth-from-the-left column) first to (e.g., all) the subpixels of the first color (e.g., red) and then to (e.g., all) the subpixels of the third color (e.g., blue) and to the subpixels in a second set of columns (e.g., a set that includes the third-from-the-left column and the seventh-from-the-left column) first to (e.g., all) the subpixels of the third color and then to (e.g., all) the subpixels of the first color.

When the rows of pixels are addressed in this sequence, for subpixels in a column connected to a common column line, all the subpixels of a common color (e.g., red) are addressed before the subpixels of a different color (e.g., blue) are addressed, which can reduce power losses due to parasitic capacitance, because, in general, there are will be relatively few voltage level changes on the column line when switching between providing signals to subpixels of different colors. That is, because signals are provided to all the circuits that control the light output OLEDs of one color first, before signals are provided to the circuits that control OLEDs of another color, there can be fewer changes in voltage level on a column line when an image is rendered on the display panel 200.

Figure 5B:
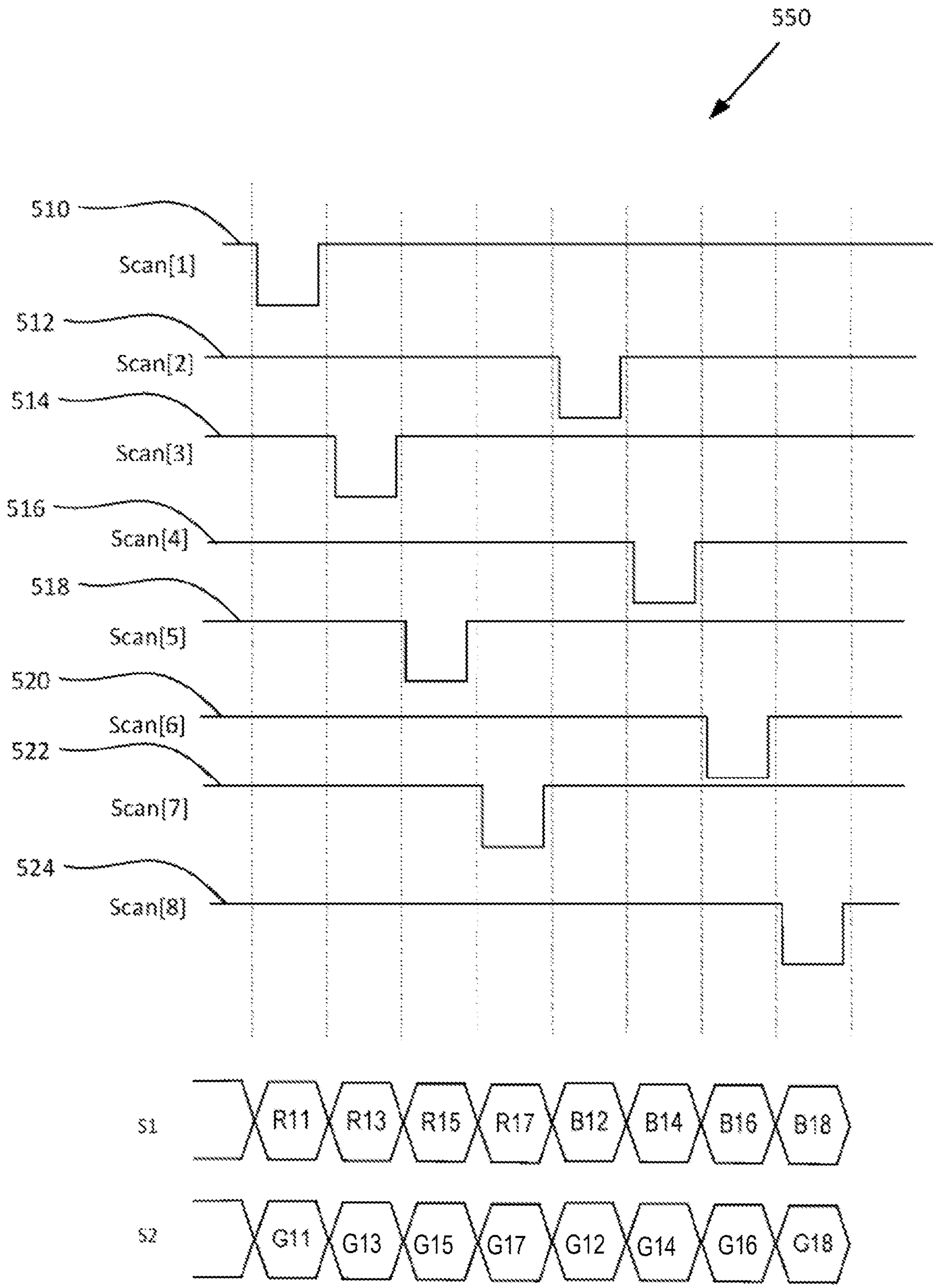
FIG. 5B is a timing diagram illustrating the addressing of individual subpixels in the Pentile RGBG array.

FIG. 5B is a timing diagram 550 illustrating the addressing of individual subpixels in the Pentile RGBG array 500. In the timing diagram 550, the state of scan[1] 510 represents the voltage applied to the scanline that controls subpixels in row 1; the state of scan[2] 512 represents the voltage applied to the scanline that controls subpixels in row 2; and the state of scan[3] 514 represents the voltage applied to the scanline that controls subpixels in row 3; the state of scan[4] 516 represents the voltage applied to the scanline that controls subpixels in row 4; the state of scan[5] 518 represents the voltage applied to the scanline that controls subpixels in row 5; and the state of scan[6] 520 represents the voltage applied to the scanline that controls subpixels in row 6; the state of scan[7] 522 represents the voltage applied to the scanline that controls subpixels in row 7; and the state of scan[8] 524 represents the voltage applied to the scanline that controls subpixels in row 8. The state of a signal S1 represents the voltage applied to the column line that controls subpixels in column 1; and a signal S2 represents the voltage applied to the column line that controls subpixels in column 2.

As seen from the state of signal S1, voltages are first applied to the column line to control the emission from red subpixels R11, R13, R15, R17, and then voltages are applied to the column line to control the emission from blue subpixels B12, B14, B16, B18, so that a transition from a voltage that controls a red pixel to a voltage that controls a blue pixel on the column line is made only once per frame. This may reduce the power loss due to parasitic capacitance when rendering images on the display panel with this scan sequence in which odd rows are scanned first and then even rows are scanned, or in which even rows are scanned first and then odd rows are scanned.

Figure 5C:
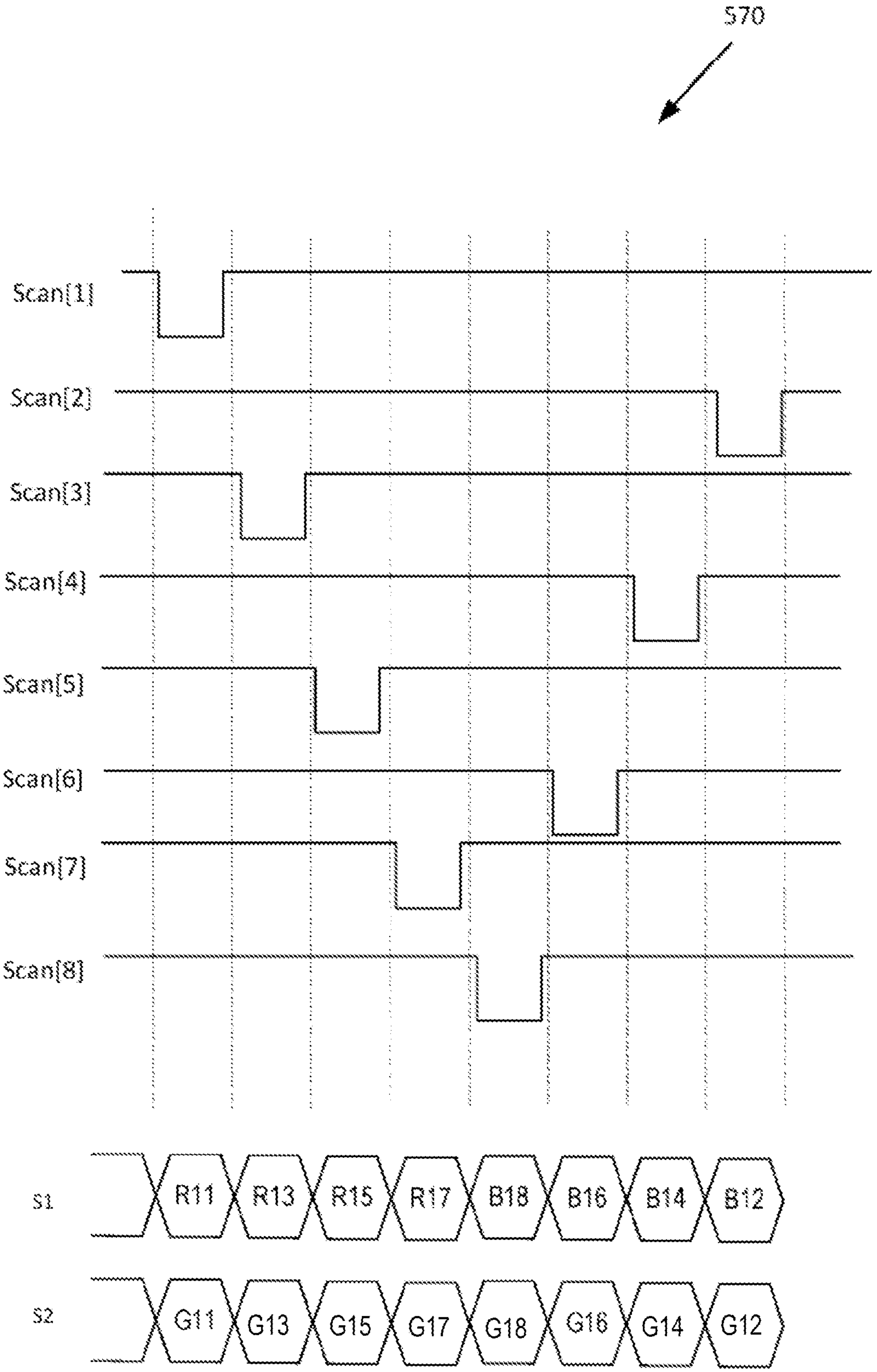
FIG. 5C is a timing diagram illustrating the addressing of individual subpixels in the Pentile RGBG array, in another implementation in which first the odd rows of the array are scanned sequentially from top to bottom and then the even rows of the array are scanned sequentially from bottom to top.

FIG. 5C is a timing diagram 570 illustrating the addressing of individual subpixels in the Pentile RGBG array 500, in another implementation in which first the odd rows of the array 500 are scanned sequentially from top to bottom and then the even rows of the array 500 are scanned sequentially from bottom to top. As seen from the state of signal S1, voltages are first applied to the column line to control, in order, the emission from red subpixels R11, R13, R15, R17, and then voltages are applied to the column line to control, in order, the emission from blue subpixels B18, B16, B14, B12, so that a transition from a voltage that controls a red pixel to a voltage that controls a blue pixel on the column line is made only once per frame. This also may reduce the power loss due to parasitic capacitance when rendering images on the display panel with this scan sequence in which odd rows are scanned first and then even rows are scanned, or in which even rows are scanned first, and then odd rows are scanned.

Figure 6B:
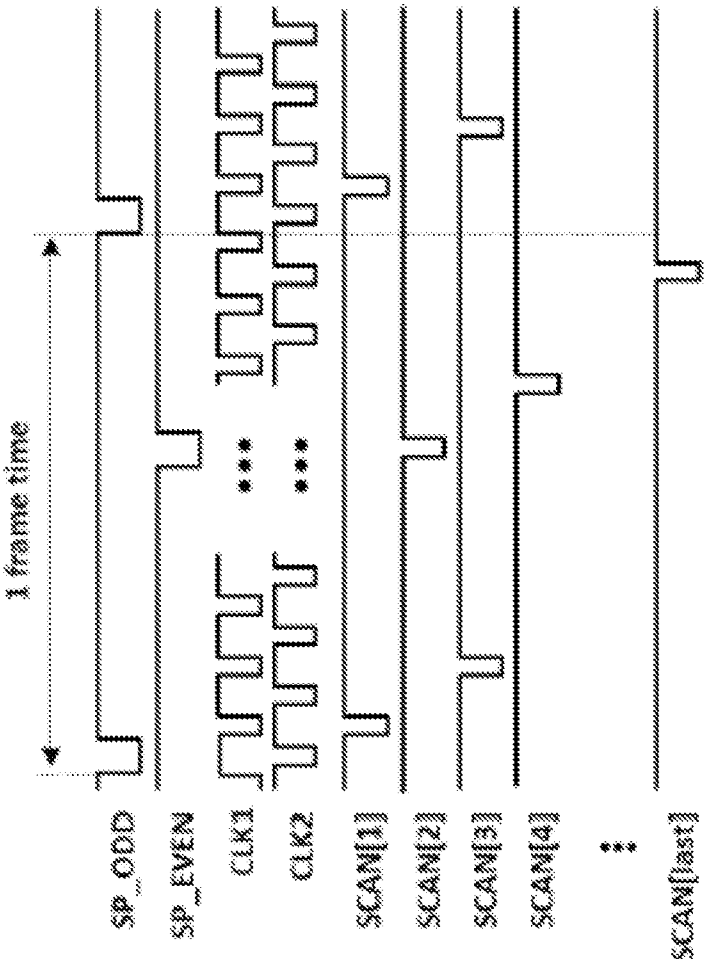
FIG. 6B is a schematic timing diagram showing the timing of start pulse signals and clock signals provided to the odd line driver and to the even line driver and showing the SCAN signals generated by the line drivers, which are provided to the display panel.
Figure 6A:
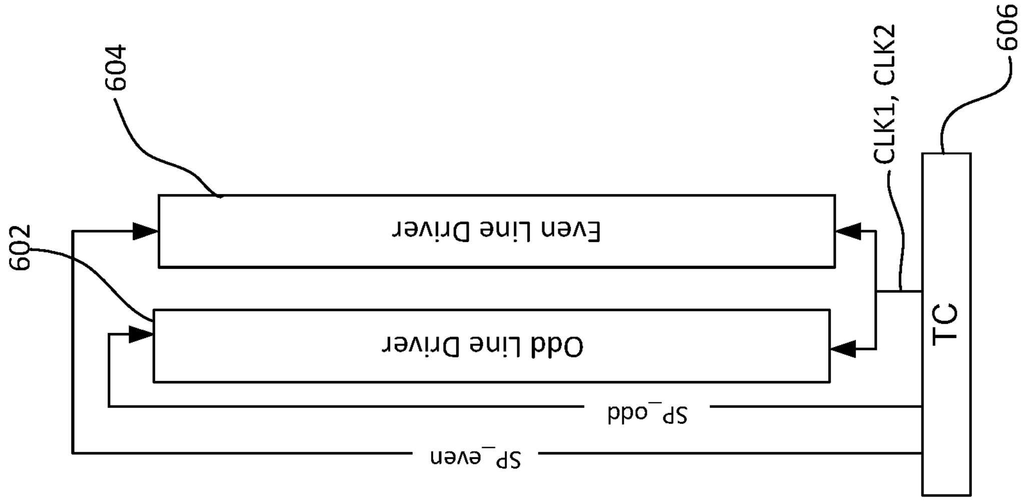
FIG. 6A is a schematic diagram of a pair of line drivers, including an odd line driver and an even line driver that each are electrically connected to a timing controller.

FIG. 6A is a schematic diagram of a pair of line drivers, including an odd line driver 602 and an even line driver 604, that each are electrically connected to a timing controller 606. The odd line driver 602 and the even line driver 604 operate like the line drivers 240 in the display panel 200 to provide driving signals on the scan lines of a display panel to control the emission of light from subpixels in the panel, with the odd line driver 602 providing driving signals to the odd lines of the display panel and the even line driver 604 providing driving signals to the even lines of the display panel. The odd line driver 602 and the even line driver 604 are triggered to generate the SCAN driving signals provided to the display panel by the receipt of a start pulse signal (SP) and clock signals (CLK1, CLK2) that are received from the timing controller 606.

FIG. 6B is a schematic timing diagram showing the timing of start pulse signals and clock signals provided to the odd line driver 602 and to the even line driver 604 and showing the SCAN signals generated by the line drivers 602, 604, which are provided to the display panel. In an implementation, the timing controller 606 can provide, once per frame period, a first start pulse signal (SP_EVEN) to the even line driver 604 (e.g., at the beginning of a frame time) and a second start pulse signal (SP_ODD) to the odd line driver 602 (e.g., at the midpoint of a frame time), and can provide the same clock signals (CLK1 and CLK2) to both the odd line driver 602 and the even line driver 604. When the second start pulse signal (SP_ODD) is received by the odd line driver 602, then SCAN signals provided by the odd line driver to the display panel can be activated by clock signals CLK1 and CLK2, and when the first start pulse signal (SP_EVEN) is received by the even line driver 604, then SCAN signals provided by the even line driver to the display panel can be activated by clock signals CLK1 and CLK2. By providing the SP_ODD signal at the beginning of a frame period and providing the SP_EVEN signal near the middle of the frame period, after SCAN signals have been provided to all rows addressed by the odd line driver, the SCAN signals generated by the odd line driver 602 can be provided sequentially to scan odd lines of the display panel and then the SCAN signals generated by the even line driver 604 can be provided sequentially to scan even lines of the display panel until all lines of the display panel have been addressed.

Figure 7B:
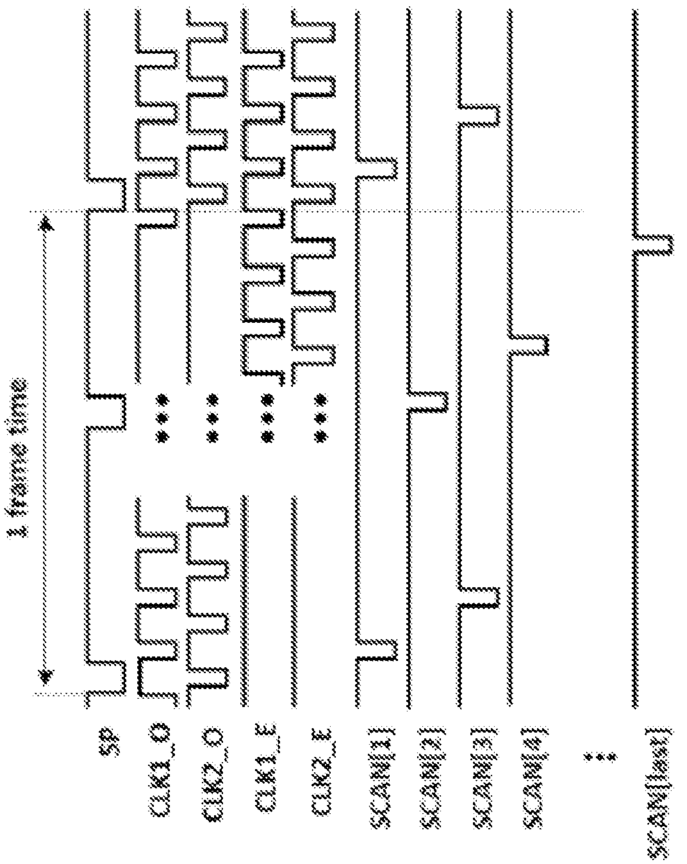
FIG. 7B is a schematic timing diagram showing the timing of start pulse signals and clock signals provided to the odd line driver and to the even line driver and showing the SCAN signals generated by the line drivers, which are provided to the display panel.
Figure 7A:
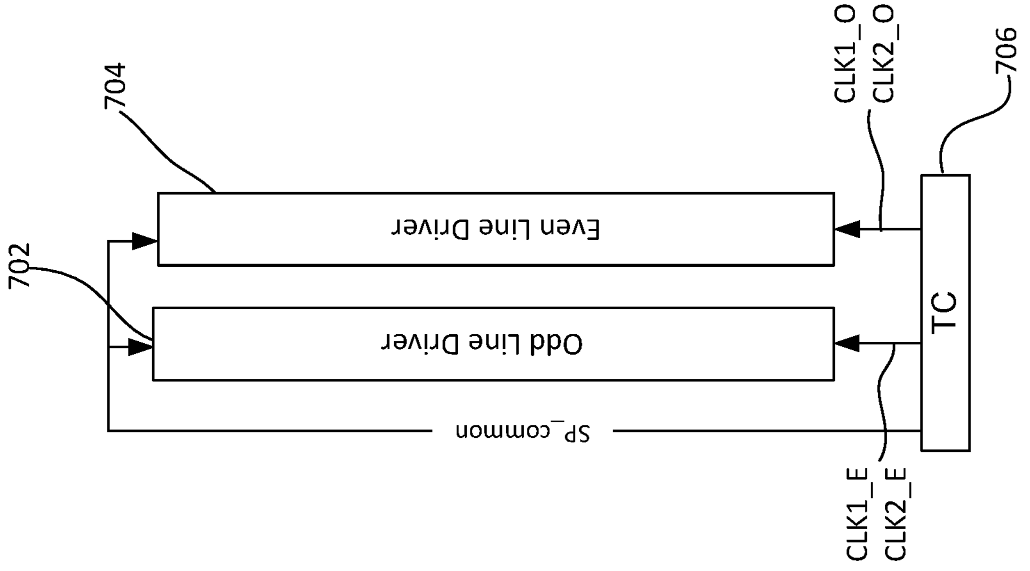
FIG. 7A is a schematic diagram of a pair of line drivers, including an odd line driver and an even line driver that each are electrically connected to a timing controller.

FIG. 7A is a schematic diagram of a pair of line drivers, including an odd line driver 702 and an even line driver 704, that each are electrically connected to a timing controller 706. The odd line driver 702 and the even line driver 704 operate like the line drivers 240 in the display panel 200 to provide driving signals on the scan lines of a display panel to control the emission of light from subpixels in the panel, with the odd line driver 702 providing driving signals to the odd lines of the display panel and the even line driver 704 providing driving signals to the even lines of the display panel. The odd line driver 702 and the even line driver 704 are triggered to generate the SCAN driving signals provided to the display panel by a start pulse signal (SP) and clock signals (CLK1, CLK2) that are received from the timing controller 706.

FIG. 7B is a schematic timing diagram showing the timing of start pulse signals and clock signals provided to the odd line driver 702 and to the even line driver 704 and showing the SCAN signals generated by the line drivers 702, 704, which are provided to the display panel. In an implementation, the timing controller 706 can provide, twice per frame period (e.g., at the beginning of a frame time and at the midpoint of the frame time) a start pulse signal (SP_common or SP) to both the odd line driver 702 and the even line driver 704, and can provide the first clock signals (CLK1_O and CLK2_O) to the odd line driver 702 and second clock signals (CLK1_E and CLK2_E) to the even line driver 704. First clock signals (CLK1_O and CLK2_O) can be sent from the timing controller 706 to the odd line driver 702 in the first half of the frame period to activate the provision of SCAN signals from the driver 702 to subpixels in odd rows of the display panel, and second clock signals (CLK1_E and CLK2_E) can be sent from the timing controller 706 to the even line driver 704 in the second half of the frame period to activate the provision of SCAN signals from the driver 702 to subpixels in even rows of the display panel.

When the first start pulse signal (SP_common or SP) during a frame period is received by the odd and even line drivers 702, 704, then SCAN signals provided by the odd line driver to the display panel can be activated by clock signals CLK1_O and CLK2_O that are sent by the timing controller 706 to the odd line driver 702. When the second start pulse signal (SP_common or SP) during a frame period is received by the odd and even line drivers 702, 704, then SCAN signals provided by the even line driver to the display panel can be activated by clock signals CLK1_E and CLK2_E that are sent by the timing controller 706 to the even line driver 704. By providing the CLK1_O and CLK2_O signals in the first half of the frame period to activate SCAN signals to all the odd rows of the display panel and providing the CLK1_E and CLK2_E signals in the second half of the frame period after SCAN signals have been provided to all rows addressed by the odd line driver, the SCAN signals generated by the odd line driver 702 can be provided sequentially to odd scan lines of the display panel and then the SCAN signals generated by the even line driver 704 can be provided sequentially to even scan lines of the display panel until all lines of the display panel have been addressed.

Figure 8B:
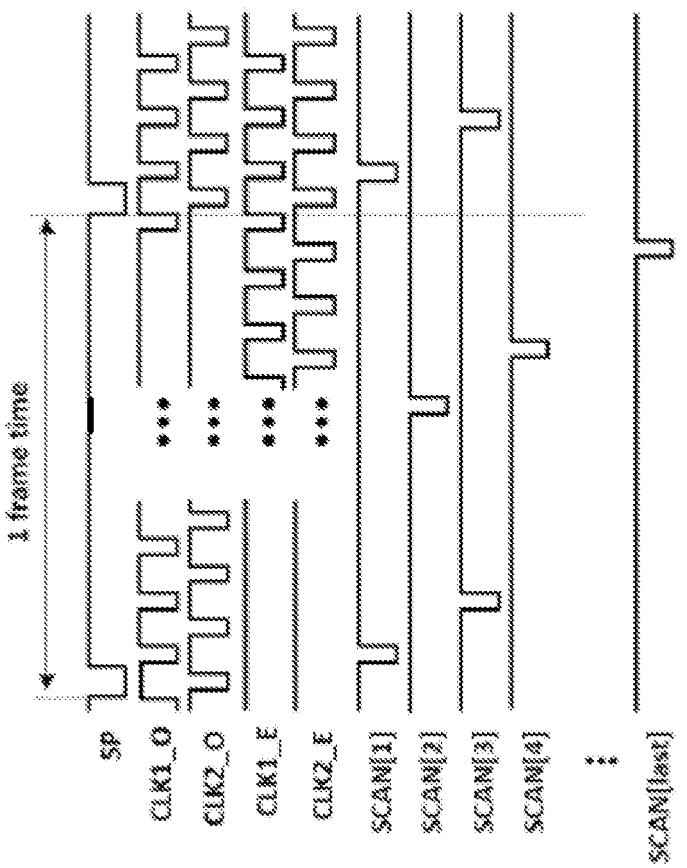
FIG. 8B is a schematic timing diagram showing the timing of start pulse signals and clock signals provided to the odd line driver and to the even line driver and showing the SCAN signals generated by the line drivers, which are provided to the display panel.
Figure 8A:
FIG. 8A is a schematic diagram of a pair of line drivers, including an odd line driver and an even line driver that each are electrically connected to a timing controller 806.

FIGS. 8A and 8B illustrate another implementation, similar to that of FIGS. 7A and 7B, but in which a single start pulse (SP) per frame period can be used.

FIG. 8A is a schematic diagram of a pair of line drivers, including an odd line driver 802 and an even line driver 804, that each are electrically connected to a timing controller 806.

FIG. 8B is a schematic timing diagram showing the timing of start pulse signals and clock signals provided to the odd line driver 802 and to the even line driver 804 and showing the SCAN signals generated by the line drivers 802, 804, which are provided to the display panel. In an implementation, the timing controller 806 can provide, once per frame period (e.g., at the beginning of a frame time) a start pulse signal (SP_common or SP) to one of the line drivers (e.g., to the odd line driver 802), and can provide the first clock signals (CLK1_O and CLK2_O) to the odd line driver 802 and second clock signals (CLK1_E and CLK2_E) to the even line driver 804. First clock signals (CLK1_O and CLK2_O) can be sent from the timing controller 806 to the line driver that receives the start pulse (e.g., the odd line driver 802) in the first half of the frame period to activate the provision of SCAN signals from the driver 802 to subpixels in odd rows of the display panel, and second clock signals (CLK1_E and CLK2_E) can be sent from the timing controller 806 to the other line driver (e.g., the even line driver 804) in the second half of the frame period to activate the provision of SCAN signals from the driver 802 to subpixels in even rows of the display panel.

The last SCAN signal output from the odd line driver 802 (e.g., the SCAN signal sent from the odd line driver to the last odd row of the display panel) can also function as a SP signal provided to the even line driver 804 to activate the provision of SCAN signals from the even line driver 804 to the display panel. Thus, only a single SP signal per frame period need be sent from the timing controller, and the SP signal can be sent to only one of the two line drivers 802, 804. Sending the SP signal to only one of the line drivers may permit the bezel around the active area of the display panel to be narrower than when SP signals are sent from the timing controller 806 to both of the line drivers 802, 804.

Figure 9B:
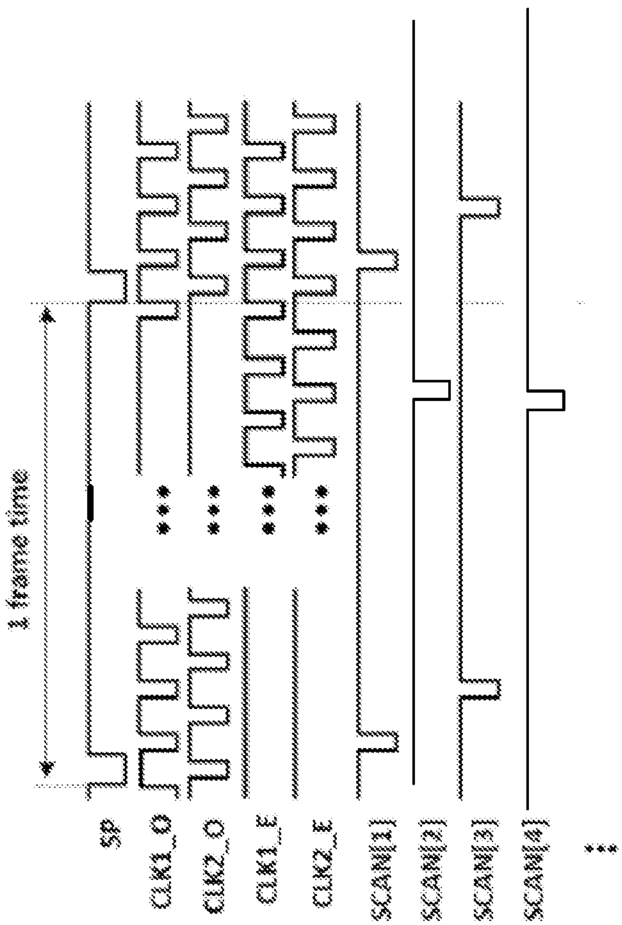
FIG. 9B is a schematic timing diagram showing the timing of start pulse signals and clock signals provided to the odd line driver and to the even line driver and showing the SCAN signals generated by the line drivers, which are provided to the display panel.
Figure 9A:
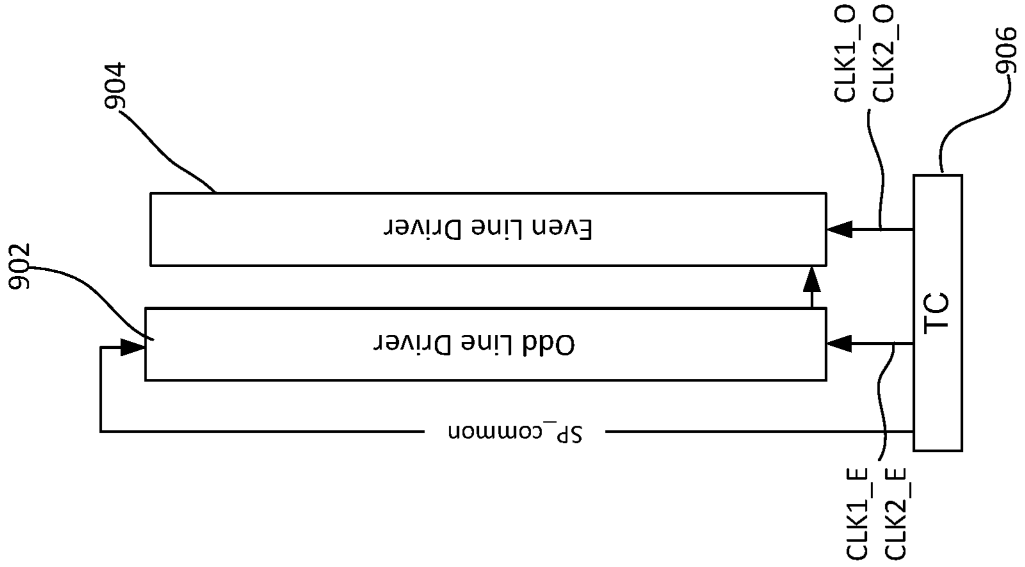
FIG. 9A is a schematic diagram of a pair of line drivers, including an odd line driver and an even line driver that each are electrically connected to a timing controller 906.

FIGS. 9A and 9B illustrate another implementation, similar to that of FIGS. 8A and 8B, but in which odd rows of the display panel are scanned in one direction (e.g., from top to bottom) and even rows of the display panel are scanned in a direction opposite to the first direction (e.g., from bottom to top), as shown and described, for example, in connection with FIG. 5C.

FIG. 9A is a schematic diagram of a pair of line drivers, including an odd line driver 902 and an even line driver 904, that each are electrically connected to a timing controller 906.

FIG. 9B is a schematic timing diagram showing the timing of start pulse signals and clock signals provided to the odd line driver 902 and to the even line driver 904 and showing the SCAN signals generated by the line drivers 902, 904, which are provided to the display panel. In an implementation, the timing controller 906 can provide, once per frame period (e.g., at the beginning of a frame time) a start pulse signal (SP_common or SP) to one of the line drivers (e.g., to the odd line driver 902), and can provide the first clock signals (CLK1_O and CLK2_O) to the odd line driver 902 and second clock signals (CLK1_E and CLK2_E) to the even line driver 904. First clock signals (CLK1_O and CLK2_O) can be sent from the timing controller 906 to the line driver that receives the start pulse (e.g., the odd line driver 902) in the first half of the frame period to activate the provision of SCAN signals from the driver 902 to subpixels in odd rows of the display panel, and second clock signals (CLK1_E and CLK2_E) can be sent from the timing controller 906 to the other line driver (e.g., the even line driver 904) in the second half of the frame period to activate the provision of SCAN signals from the driver 902 to subpixels in even rows of the display panel.

The last SCAN signal output from the odd line driver 902 (e.g., the SCAN signal sent from the odd line driver to the last odd row of the display panel) can also function as a SP signal provided to the even line driver 904 to activate the provision of SCAN signals from the even line driver 904 to the display panel. The scanning of odd rows of the display panel can proceed in one direction (e.g., from top to bottom) when the SP signal is provided to a circuit in the odd line driver that drives a topmost odd row, and the scanning of even rows of the display panel can proceed an direction opposite to the first direction (e.g., from bottom to top) when the last SCAN signal output from the odd line driver 902 is provided to a circuit in the even line driver 904 that drives a bottommost even row of the display panel.

Figure 10B:
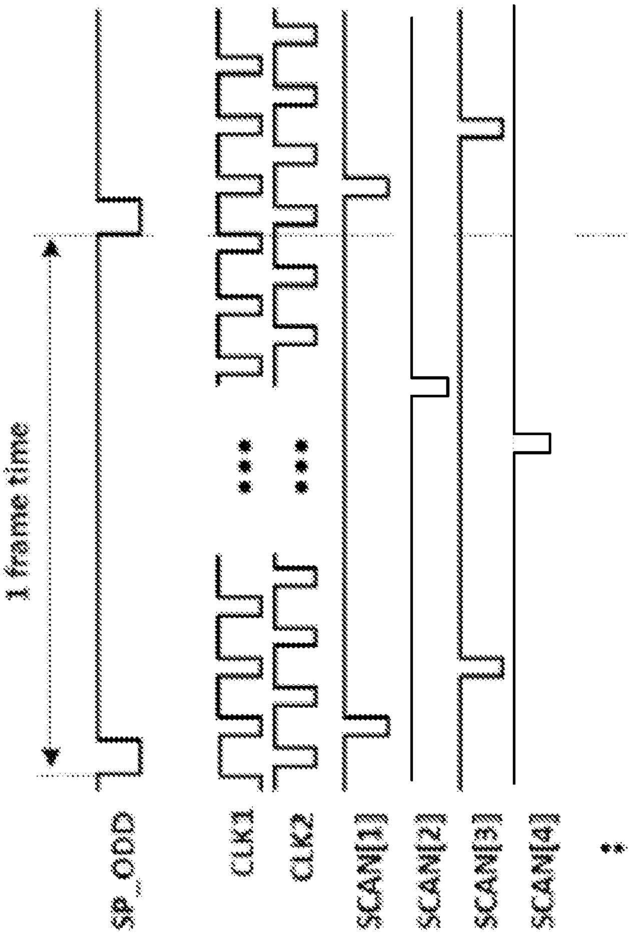
FIGS. 10A and 10B illustrate another implementation, in which odd rows of the display panel are scanned in one direction by an odd line driver and even rows of the display panel are scanned in a direction opposite to the first direction, where both line drivers are electrically connected to a timing controller.
Figure 10A:
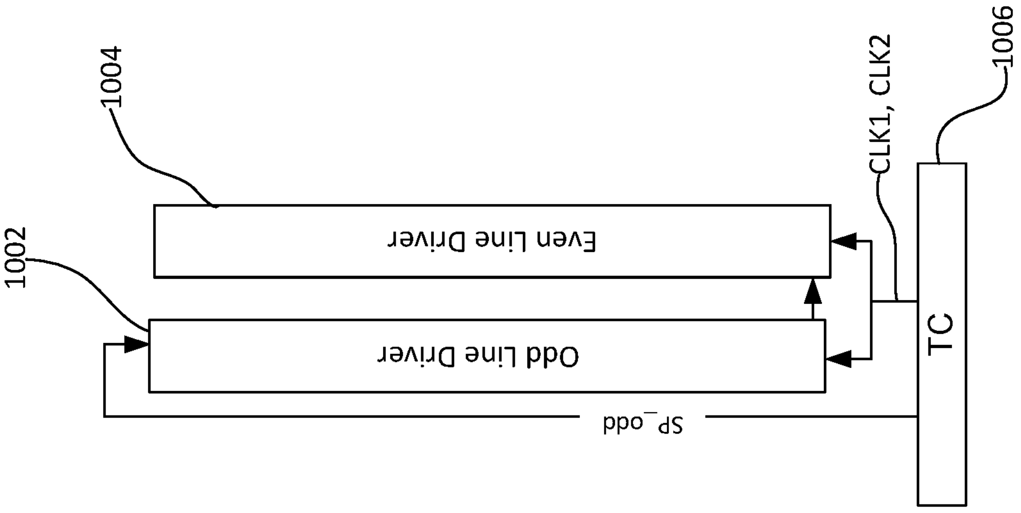

FIGS. 10A and 10B illustrate another implementation, similar to that of FIGS. 9A and 9B, in which odd rows of the display panel are scanned in one direction (e.g., from top to bottom) by an odd line driver 1002 and even rows of the display panel are scanned in a direction opposite to the first direction (e.g., from bottom to top) by an even line driver 1004, where both line drivers are electrically connected to a timing controller 1006. The same clock signals CLK1, CLK2 are provided by the timing controller 1006 to each of the drivers 1002, 1004, and the last SCAN signal output from the odd line driver 1002 (e.g., the SCAN signal sent from the odd line driver to the last odd row of the display panel) can also function as a SP signal provided to the even line driver 1004 to activate the provision of SCAN signals from the even line driver 1004 to the display panel. Thus, the scanning of odd rows of the display panel can proceed in one direction (e.g., from top to bottom) when the SP signal is provided to a circuit in the odd line driver that drives a topmost odd row, and the scanning of even rows of the display panel can proceed an direction opposite to the first direction (e.g., from bottom to top) when the last SCAN signal output from the odd line driver 1002 is provided to a circuit in the even line driver 1004 that drives a bottommost even row of the display panel.

Figure 11:
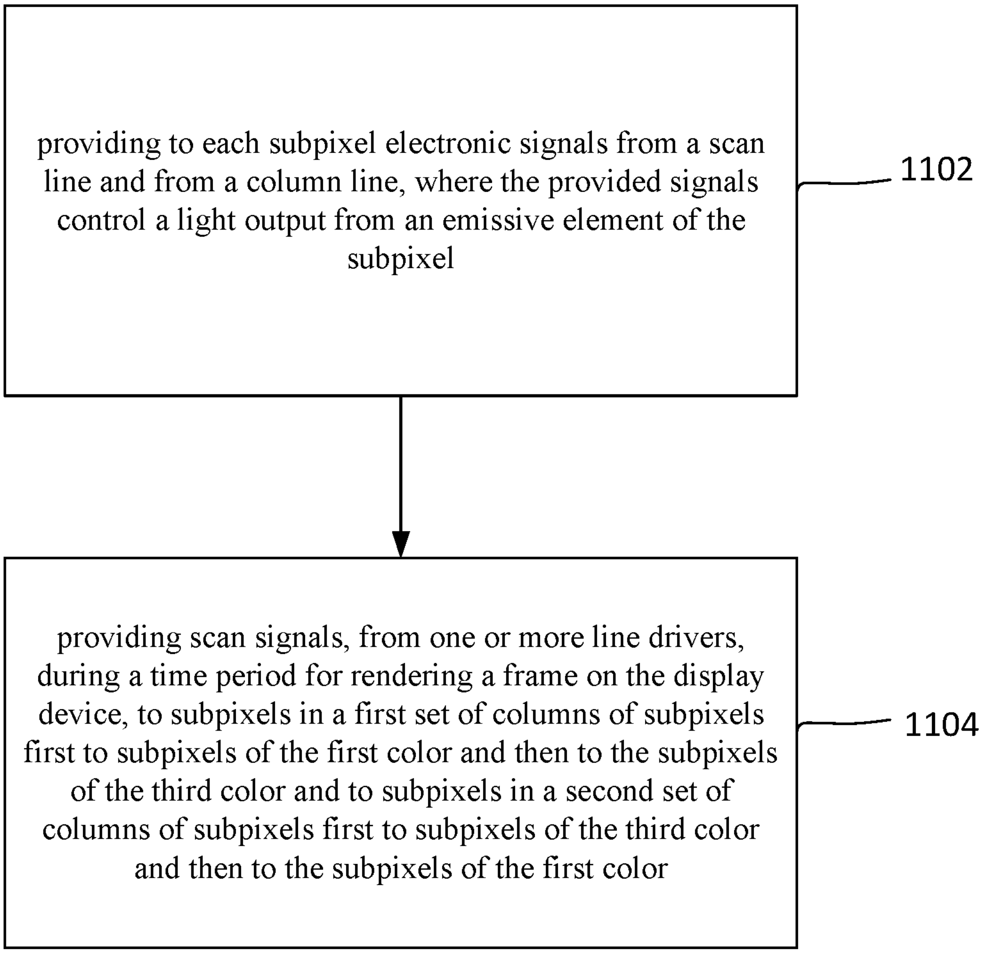
FIG. 11 is a schematic diagram of a process for rendering images on a display panel according to techniques described herein.

FIG. 11 is a schematic diagram of a process 1100 for driving a display panel according to techniques described herein, where the display panel includes: a plurality of subpixels of a first color (e.g., red); a plurality of subpixels of a second color (e.g., green); a plurality of subpixels of a third color (e.g., blue), the plurality of subpixels of the first, second, and third colors being arranged in an array having a plurality of rows and a plurality of columns, with rows of the array including subpixels arranged in a repeating pattern subpixels of the first color, the second color, the third color, and the second color, and with alternating columns of the array including subpixels: (a) arranged in a repeating pattern of a subpixel of the first color and a subpixels of the third color, and (b) including only subpixels of the second color, a plurality of scan lines; and a plurality of column lines, with each subpixel in a column of the array being electrically connected to a same column line of the plurality of column lines.

The process 1100 includes providing to each subpixel electronic signals from a scan line and from a column line, wherein the provided signals control a light output from an emissive element of the subpixel (1102). The process further includes providing scan signals, from one or more line drivers, during a time period for rendering a frame on the display device, to subpixels in a first set of columns of subpixels first to subpixels of the first color and then to the subpixels of the third color and to subpixels in a second set of columns of subpixels first to subpixels of the third color and then to the subpixels of the first color (1104).

In the specification and/or figures, a number of embodiments have been disclosed. The present disclosure is not limited to such exemplary embodiments. The use of the term "and/or" includes any and all combinations of one or more of the associated listed items. Unless otherwise noted, specific terms have been used in a generic and descriptive sense and not for purposes of limitation. As used in this specification, spatial relative terms (e.g., in front of, behind, above, below, and so forth) are intended to encompass different orientations of the device in use or operation in addition to the orientation depicted in the figures. For example, a "front surface" of a mobile computing device may be a surface facing a user, in which case the phrase "in front of" implies closer to the user.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations.

The implementations described herein can include various combinations and/or sub-combinations of the functions, components, and/or features of the different implementations described.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "detecting," "transmitting," "receiving," "generating," "storing," "ranking," "extracting," "obtaining," "assigning," "partitioning," "computing," "filtering," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other implementations will be apparent to those of skill in the art upon reading and understanding the above description. The scope of the disclosure should, therefore, be determined with reference to the appended claims, along with the full scope of equivalents to which such claims are entitled.

The invention claimed is:

1. A display device comprising:

a plurality of subpixels of a first color;

a plurality of subpixels of a second color;

a plurality of subpixels of a third color, wherein the plurality of subpixels of the first, second, and third colors are arranged in an array, the array having a plurality of rows and a plurality of columns, with rows of the array including subpixels arranged in a repeating pattern of subpixels of the first color, the second color, the third color, and the second color, and with alternating columns of the array including subpixels: (a) arranged in a repeating pattern of a subpixel of the first color and a subpixel of the third color, and (b) having only subpixels of the second color;

a plurality of scan lines;

a plurality of column lines;

each subpixel in a column of the array being electrically connected to a same column line of the plurality of column lines and each of the subpixels in a column being configured for receiving electronic scan signals from a scan line and from the column line connected to the subpixel, wherein the received signals control a light output from an emissive element of the subpixel; and one or more line drivers configured for providing the electronic scan signals, during a time period for rendering a frame on the display device:

(i) to subpixels in a first column of subpixels, first to multiple subpixels of the first color in a sequential order and then to multiple subpixels of the third color in a sequential order, and (ii) to subpixels in a second column of subpixels, first to multiple subpixels of the third color in a sequential order and then to multiple subpixels of the first color in a sequential order.

2. The display device of claim 1, wherein the plurality of rows includes more than 1300 rows, and wherein the plurality of columns includes more than 700 columns.

3. A display device comprising:

a plurality of subpixels of a first color;

a plurality of subpixels of a second color;

a plurality of subpixels of a third color, wherein the plurality of subpixels of the first, second, and third colors are arranged in an array, the array having a plurality of rows and a plurality of columns, with rows of the array including subpixels arranged in a repeating pattern of subpixels of the first color, the second color, the third color, and the second color, and with alternating columns of the array including subpixels: (a) arranged in a repeating pattern of a subpixel of the first color and a subpixel of the third color, and (b) having only subpixels of the second color;

a plurality of scan lines;

a plurality of column lines;

each subpixel in a column of the array being electrically connected to a same column line of the plurality of column lines and each of the subpixels in a column being configured for receiving electronic scan signals from a scan line and from the column line connected to the subpixel, wherein the received signals control a light output from an emissive element of the subpixel; and one or more line drivers configured for providing the electronic scan signals, during a time period for rendering a frame on the display device, to subpixels in a first set of columns of subpixels first to subpixels of the first color and then to the subpixels of the third color and to subpixels in a second set of columns of subpixels first to subpixels of the third color and then to the subpixels of the first color, wherein the one or more line drivers includes:

a first line driver configured to provide scan signals to subpixels of the first color in the first set of columns and to subpixels of the third color in the second set of columns, and a second line driver configured to provide scan signals to subpixels of the third color in the first set of columns and to subpixels of the first color in the second set of columns.

4. The display device of claim 3, further comprising a timing controller electrically coupled to the first and second line drivers, wherein the timing controller is configured for providing, during the time period for rendering a frame on the display device, a first start pulse signal to the first line driver, a second start pulse to the second line driver and a plurality of clock signals to both the first and second line drivers, and wherein the first line driver is configured for providing the scan signals to subpixels of the first color in the first set of columns and to subpixels of the third color in the second set of columns in response to the provided first start pulse signal and the plurality of clock signals, and wherein the second line driver is configured for providing scan signals to subpixels of the third color in the first set of columns and to subpixels of the first color in the second set of columns in response to the provided second start pulse signal and the plurality of clock signals.

5. The display device of claim 3, further comprising a timing controller electrically coupled to the first and second line drivers, wherein the timing controller is configured for providing, during a time period for rendering a frame on the display device, a common start pulse signal to the first line driver and to the second line driver, a plurality of first clock signals to the first line driver and a plurality of second clock signals to the second line driver, and wherein the first line driver is configured for providing the scan signals to subpixels of the first color in the first set of columns and to subpixels of the third color in the second set of columns in response to the provided common start pulse signal and the plurality of first clock signals, and wherein the second line driver is configured for providing scan signals to subpixels of the third color in the first set of columns and to subpixels of the first color in the second set of columns in response to the provided common start pulse signal and the plurality of second clock signals.

6. The display device of claim 3, further comprising a timing controller electrically coupled to the first and second line drivers, wherein the timing controller is configured for providing, during a time period for rendering a frame on the display device, a first start pulse signal to the first line driver, a plurality of first clock signals to the first line driver and a plurality of second clock signals to the second line driver, and wherein the first line driver is configured for providing the scan signals to subpixels of the first color in the first set of columns and to subpixels of the third color in the second set of columns in response to the provided first start pulse signal and the plurality of first clock signals and wherein the first line driver is configured for providing a second start pulse signal to the second line driver when first line driver has provided scan signals to all of the subpixels of the first color in the first set of columns and all of the subpixels of the third color in the second set of columns, and wherein the second line driver is configured for providing scan signals to subpixels of the third color in the first set of columns and to subpixels of the first color in the second set of columns in response to the provided second start pulse signal and the plurality of second clock signals.

7. The display device of claim 3, wherein the first line driver is configured for providing scan signals to subpixels of the first color in the first set of columns and to subpixels of the third color in the second set of columns a sequential order, on each column, from a top of the display device to a bottom of the display device, and the second line driver is configured for providing scan signals subpixels of the third color in the first set of columns and to subpixels of the first color in the second set of columns a sequential order, on each column, from a bottom of the display device to a top of the display device.

8. The display device of claim 7, further comprising a timing controller electrically coupled to the first and second line drivers, wherein the timing controller is configured for providing, during a time period for rendering a frame on the display device, a first start pulse signal to the first line driver, a plurality of first clock signals to the first line driver and a plurality of second clock signals to the second line driver, and wherein the first line driver is configured for providing the scan signals to subpixels of the first color in the first set of columns and to subpixels of the third color in the second set of columns in response to the provided first start pulse signal and the plurality of first clock signals and wherein the first line driver is configured for providing a second start pulse signal to the second line driver when first line driver has provided scan signals to all of the subpixels of the first color in the first set of columns and to all of the subpixels of the third color in the second set of columns, and wherein the second line driver is configured for providing scan signals to subpixels of the third color in the first set of columns and to subpixels of the first color in the second set of columns in response to the provided second start pulse signal and the plurality of second clock signals.

9. The display device of claim 7, further comprising a timing controller electrically coupled to the first and second line drivers, wherein the timing controller is configured for providing, during a time period for rendering a frame on the display device, a first start pulse signal to the first line driver, a plurality of clock signals to both the first line driver to the second line driver, and wherein the first line driver is configured for providing the scan signals to subpixels of the first color in the first set of columns and to subpixels of the third color in the second set of columns in response to the provided first start pulse signal and the plurality of clock signals and wherein the first line driver is configured for providing a second start pulse signal to the second line driver when first line driver has provided scan signals to all of the subpixels of the first color in the first set of columns and to all off the subpixels of the third color in the second set of columns, and wherein the second line driver is configured for providing the scan signals to subpixels of the third color in the first set of columns and to subpixels of the first color in the second set of columns in response to the provided second start pulse signal and the plurality of clock signals.

10. The display device of claim 1, wherein the subpixels of the first, second, and third colors include organic light emitting diodes and wherein the first color includes red (R), the second color includes green (G), the third color includes blue (B), and wherein the plurality of subpixels of the first, second, and third colors are arranged in a Pentile RGBG array.

11. A method of driving a display panel, the display panel having: a plurality of subpixels of a first color; a plurality of subpixels of a second color; a plurality of subpixels of a third color, the plurality of subpixels of the first, second, and third colors being arranged in an array having a plurality of rows and a plurality of columns, with rows of the array including subpixels arranged in a repeating pattern subpixels of the first color, the second color, the third color, and the second color, and with alternating columns of the array including subpixels: (a) arranged in a repeating pattern of a subpixel of the first color and a subpixel of the third color, and (b) including only subpixels of the second color, a plurality of scan lines; and a plurality of column lines, with each subpixel in a column of the array being electrically connected to a same column line of the plurality of column lines, the method comprising:

providing to each subpixel electronic signals from a scan line and from a column line, wherein the provided signals control a light output from an emissive element of the subpixel;

providing scan signals, from one or more line drivers, during a time period for rendering a frame on the display device;

(i) to subpixels in a first column of subpixels, first to multiple subpixels of the first color in a sequential order and then to multiple subpixels of the third color in a sequential order, and (ii) to subpixels in a second column of subpixels, first to multiple subpixels of the third color in a sequential order and then to multiple subpixels of the first color in a sequential order.

12. The method of claim 11, wherein the subpixels of the first, second, and third colors include organic light emitting diodes and wherein the first color includes red (R), the second color includes green (G), the third color includes blue (B), and wherein the plurality of subpixels of the first, second, and third colors are arranged in a Pentile RGBG array.

13. The method of claim 11, wherein the plurality of rows includes more than 1300 rows, and wherein the plurality of columns includes more than 700 columns.

14. A method of driving a display panel, the display panel having: a plurality of subpixels of a first color; a plurality of subpixels of a second color; a plurality of subpixels of a third color, the plurality of subpixels of the first, second, and third colors being arranged in an array having a plurality of rows and a plurality of columns, with rows of the array including subpixels arranged in a repeating pattern subpixels of the first color, the second color, the third color, and the second color, and with alternating columns of the array including subpixels: (a) arranged in a repeating pattern of a subpixel of the first color and a subpixel of the third color, and (b) including only subpixels of the second color, a plurality of scan lines; and a plurality of column lines, with each subpixel in a column of the array being electrically connected to a same column line of the plurality of column lines, the method comprising:

providing to each subpixel electronic signals from a scan line and from a column line, wherein the provided signals control a light output from an emissive element of the subpixel;

providing scan signals, from one or more line drivers, during a time period for rendering a frame on the display device, to subpixels in a first set of columns of subpixels first to subpixels of the first color and then to the subpixels of the third color and to subpixels in a second set of columns of subpixels first to subpixels of the third color and then to the subpixels of the first color, including by:

providing scan signals to subpixels of the first color in the first set of columns and to subpixels of the third color in the second set of columns from a first line driver; and providing scan signals to subpixels of the third color in the first set of columns and to subpixels of the first color in the second set of columns from a second line driver.

15. The method of claim 14, further comprising:

providing, from a timing controller electrically coupled to the first and second line drivers, during the time period for rendering a frame on the display device, a first start pulse signal to the first line driver, a second start pulse to the second line driver and a plurality of clock signals to both the first and second line drivers;

providing scan signals to subpixels of the first color in the first set of columns and to subpixels of the third color in the second set of columns in response to the provided first start pulse signal and the plurality of clock signals; and providing scan signals to subpixels of the third color in the first set of columns and to subpixels of the first color in the second set of columns in response to the provided second start pulse signal and the plurality of clock signals.

16. The method of claim 14, further comprising:

providing, from a timing controller electrically coupled to the first and second line drivers, during the time period for rendering a frame on the display device, a common start pulse signal to the first line driver and to the second line driver, a plurality of first clock signals to the first line driver, and a plurality of second clock signals to the second line driver;

providing scan signals to subpixels of the first color in the first set of columns and to subpixels of the third color in the second set of columns in response to the provided common start pulse signal and the plurality of first clock signals;

providing scan signals to subpixels of the third color in the first set of columns and to subpixels of the first color in the second set of columns in response to the provided common start pulse signal and the plurality of second clock signals.

17. The method of claim 14, further comprising:

providing, from a timing controller electrically coupled to the first and second line drivers, during the time period for rendering a frame on the display device, a first start pulse signal to the first line driver, a plurality of first clock signals to the first line driver, and a plurality of second clock signals to the second line driver;

providing, from the first line driver, scan signals to subpixels of the first color in the first set of columns and to subpixels of the third color in the second set of columns in response to the provided first start pulse signal and the plurality of first clock signals;

providing, from the first line driver, a second start pulse signal to the second line driver when first line driver has provided scan signals to all of the subpixels of the first color in the first set of columns and all of the subpixels of the third color in the second set of columns; and providing, from the second line driver, scan signals to subpixels of the third color in the first set of columns and to subpixels of the first color in the second set of columns in response to the provided second start pulse signal and the plurality of second clock signals.

18. The method of claim 14, further comprising:

providing, from the first line driver, scan signals to subpixels of the first color in the first set of columns and to subpixels of the third color in the second set of columns a sequential order, on each column, from a top of the display device to a bottom of the display device, and providing, from the second line driver, scan signals subpixels of the third color in the first set of columns and to subpixels of the first color in the second set of columns a sequential order, on each column, from a bottom of the display device to a top of the display device.

19. The method of claim 18, further comprising:

providing, from a timing controller electrically coupled to the first and second line drivers, during the time period for rendering a frame on the display device, a first start pulse signal to the first line driver, a plurality of first clock signals to the first line driver, and a plurality of second clock signals to the second line driver;

providing the scan signals to subpixels of the first color in the first set of columns and to subpixels of the third color in the second set of columns in response to the provided first start pulse signal and the plurality of first clock signals;

providing a second start pulse signal from the first line driver to the second line driver when first line driver has provided scan signals to all of the subpixels of the first color in the first set of columns and to all of the subpixels of the third color in the second set of columns; and providing scan signals from the second line driver to the subpixels of the third color in the first set of columns and to the subpixels of the first color in the second set of columns in response to the provided second start pulse signal and the plurality of second clock signals.

20. The method of claim 18, further comprising:

providing, from a timing controller electrically coupled to the first and second line drivers, during the time period for rendering a frame on the display device, a first start pulse signal to the first line driver and a plurality of clock signals to both the first line driver to the second line driver;

providing scan signals to the subpixels of the first color in the first set of columns and to subpixels of the third color in the second set of columns in response to the provided first start pulse signal and the plurality of clock signals;

providing a second start pulse signal from the first line driver to the second line driver when first line driver has provided scan signals to all of the subpixels of the first color in the first set of columns and to all of the subpixels of the third color in the second set of columns; and providing the scan signals to the subpixels of the third color in the first set of columns and to subpixels of the first color in the second set of columns in response to the provided second start pulse signal and the plurality of clock signals.

* * * * *